US009516531B2

(12) United States Patent
Awoniyi et al.

(10) Patent No.: US 9,516,531 B2
(45) Date of Patent: Dec. 6, 2016

(54) ASSISTANCE INFORMATION FOR FLEXIBLE BANDWIDTH CARRIER MOBILITY METHODS, SYSTEMS, AND DEVICES

(71) Applicant: QUALCOMM Incorporated, San Diego, CA (US)

(72) Inventors: Olufunmilola O. Awoniyi, San Diego, CA (US); Soumya Das, San Diego, CA (US); Edwin C. Park, San Diego, CA (US); Roy Franklin Quick, Jr., San Diego, CA (US); Samir Salib Soliman, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 345 days.

(21) Appl. No.: 13/662,845

(22) Filed: Oct. 29, 2012

(65) Prior Publication Data

US 2013/0114566 A1 May 9, 2013

Related U.S. Application Data

(60) Provisional application No. 61/556,777, filed on Nov. 7, 2011, provisional application No. 61/568,742, filed on Dec. 9, 2011, provisional application No. 61/607,502, filed on Mar. 6, 2012.

(51) Int. Cl.
*H04W 24/10* (2009.01)
*H04W 36/00* (2009.01)
(Continued)

(52) U.S. Cl.
CPC ......... *H04W 24/10* (2013.01); *H04W 36/0022* (2013.01); *H04W 36/0083* (2013.01); *H04L 1/0038* (2013.01); *H04W 28/20* (2013.01); *H04W 48/08* (2013.01)

(58) Field of Classification Search
CPC .................................................... H04W 72/00
USPC .................................................. 370/328, 331
See application file for complete search history.

(56) References Cited

U.S. PATENT DOCUMENTS 5,117,443 A 5/1992 Shires
5,640,385 A 6/1997 Long et al.
(Continued)

FOREIGN PATENT DOCUMENTS

EP 1213868 A1 6/2002
EP 1816666 A1 8/2007
(Continued)

OTHER PUBLICATIONS

"3rd Generation Partnership Project; Technical Specification Group Radio Access Network; EvolVed Unilversal Terrestrial Radio Access (E-UTRA); Radio Resource Control (RRC); Protocol specification (Release 10)", 3GPP Standard; 3GPP TS 36.331, V18.3.0, Sep. 30, 2011.*

(Continued)

*Primary Examiner* — Hassan Kizou
*Assistant Examiner* — Abdullahi Ahmed
(74) *Attorney, Agent, or Firm* — Jia J. Wu

(57) ABSTRACT

Methods, systems, and devices for mobility management for wireless communications systems that utilize a flexible bandwidth carrier are provided. Some embodiments include determining and transmitting assistance information to one or more user equipment (UEs) to facilitate mobility management with respect to the flexible bandwidth carrier. Some embodiments include signaling flexible bandwidth carrier information to UEs including, but not limited to: UE-centric approaches, network-centric approaches, network-centric approaches with PLMN, SIB creation approaches, and/or application layer approaches. A flexible bandwidth carrier may involve a wireless communications system that may utilize portions of spectrum that may not fit a normal bandwidth. A flexible bandwidth carrier may be generated with respect to a normal bandwidth carrier through dilating, or scaling down, the time or the chip rate of the flexible bandwidth carrier with respect to the normal bandwidth carrier. Some embodiments may expand a bandwidth for a flexible bandwidth carrier.

58 Claims, 17 Drawing Sheets

(51) Int. Cl.
*H04W 48/08* (2009.01)
*H04W 28/20* (2009.01)
*H04L 1/00* (2006.01)

(56) References Cited

U.S. PATENT DOCUMENTS

| | | |
|---|---|---|
| 5,949,767 A | 9/1999 | Shoji |
| 6,041,222 A | 3/2000 | Horton et al. |
| 6,236,647 B1 | 5/2001 | Amalfitano |
| 6,424,826 B1 | 7/2002 | Horton et al. |
| 6,449,596 B1 | 9/2002 | Ejima |
| 6,535,723 B1 | 3/2003 | Jiang et al. |
| 6,539,050 B1 | 3/2003 | Lee et al. |
| 6,693,887 B2 | 2/2004 | Stanwood et al. |
| 6,694,147 B1 | 2/2004 | Viswanath et al. |
| 6,829,227 B1 | 12/2004 | Pitt et al. |
| 6,845,238 B1 | 1/2005 | Muller |
| 6,944,460 B2 | 9/2005 | Haartsen |
| 7,010,300 B1 | 3/2006 | Jones et al. |
| 7,069,035 B2 | 6/2006 | Chen et al. |
| 7,123,710 B2 | 10/2006 | Ravishankar |
| 7,123,910 B2 | 10/2006 | Lucidarme et al. |
| 7,145,876 B2 | 12/2006 | Huang et al. |
| 7,193,982 B2 | 3/2007 | Frerking et al. |
| 7,263,365 B2 | 8/2007 | Rudowicz et al. |
| 7,321,780 B2 | 1/2008 | Love et al. |
| 7,324,553 B1 | 1/2008 | Varier et al. |
| 7,394,792 B1 | 7/2008 | Von |
| 7,535,900 B2 | 5/2009 | Shenoi |
| 7,558,310 B1 | 7/2009 | Von |
| 7,602,707 B2 | 10/2009 | Guo et al. |
| 7,796,632 B2 | 9/2010 | Hasty et al. |
| 7,839,900 B1 * | 11/2010 | Herder et al. ............... 370/545 |
| 7,865,359 B2 | 1/2011 | Chang |
| 7,898,947 B2 | 3/2011 | Briscoe et al. |
| 7,953,167 B2 | 5/2011 | Ode et al. |
| 7,969,858 B2 | 6/2011 | Laroia et al. |
| 8,000,706 B2 | 8/2011 | Lee et al. |
| 8,045,972 B2 | 10/2011 | Ferzali et al. |
| 8,054,893 B2 | 11/2011 | Mizusawa |
| 8,064,398 B2 | 11/2011 | Agashe et al. |
| 8,085,713 B2 | 12/2011 | Kang |
| 8,085,731 B2 | 12/2011 | Zhao et al. |
| 8,150,344 B1 | 4/2012 | Goyal et al. |
| 8,169,953 B2 | 5/2012 | Damnjanovic et al. |
| 8,325,670 B2 | 12/2012 | Afrashteh et al. |
| 8,514,883 B2 * | 8/2013 | Pan et al. ............... 370/468 |
| 8,547,840 B1 | 10/2013 | Kumar et al. |
| 8,804,693 B2 * | 8/2014 | Dural et al. ............... 370/351 |
| 8,837,375 B2 * | 9/2014 | Das et al. ............... 370/328 |
| 8,873,505 B2 * | 10/2014 | Zhang et al. ............... 370/331 |
| 9,001,679 B2 | 4/2015 | Das et al. |
| 9,049,633 B2 | 6/2015 | Das et al. |
| 9,055,496 B2 | 6/2015 | Das et al. |
| 2001/0012271 A1 | 8/2001 | Berger |
| 2002/0065089 A1 | 5/2002 | Soliman |
| 2002/0110101 A1 | 8/2002 | Gopalakrishnan et al. |
| 2002/0158801 A1 | 10/2002 | Crilly et al. |
| 2002/0159501 A1 | 10/2002 | Agami et al. |
| 2003/0081538 A1 | 5/2003 | Walton et al. |
| 2003/0203721 A1 | 10/2003 | Berezdivin et al. |
| 2003/0224730 A1 | 12/2003 | Muszynski et al. |
| 2004/0128110 A1 | 7/2004 | Schulte et al. |
| 2005/0065784 A1 | 3/2005 | McAulay et al. |
| 2005/0208973 A1 | 9/2005 | Iochi |
| 2006/0171424 A1 | 8/2006 | Choi |
| 2006/0246930 A1 | 11/2006 | Kim et al. |
| 2006/0250935 A1 | 11/2006 | Hamamoto et al. |
| 2006/0291429 A1 | 12/2006 | Matusz |
| 2007/0049307 A1 | 3/2007 | Mueckenheim et al. |
| 2007/0081604 A1 | 4/2007 | Khan et al. |
| 2007/0217440 A1 | 9/2007 | Cho et al. |
| 2007/0230414 A1 | 10/2007 | Afrashteh et al. |
| 2007/0268959 A1 | 11/2007 | Bi et al. |
| 2008/0026752 A1 | 1/2008 | Flore et al. |
| 2008/0095108 A1 | 4/2008 | Malladi et al. |
| 2008/0144612 A1 * | 6/2008 | Honkasalo et al. ............ 370/370 |
| 2008/0151743 A1 * | 6/2008 | Tong ............ H04B 1/707 370/204 |
| 2008/0165892 A1 | 7/2008 | Yang et al. |
| 2008/0227453 A1 | 9/2008 | Somasundaram et al. |
| 2008/0253320 A1 | 10/2008 | Piggin et al. |
| 2008/0298442 A1 | 12/2008 | Deng et al. |
| 2009/0016320 A1 | 1/2009 | Li et al. |
| 2009/0042532 A1 | 2/2009 | Bienas et al. |
| 2009/0074039 A1 | 3/2009 | Miller |
| 2009/0094650 A1 | 4/2009 | Carmichael |
| 2009/0116389 A1 | 5/2009 | Ji et al. |
| 2009/0135713 A1 | 5/2009 | Hwang et al. |
| 2009/0141689 A1 | 6/2009 | Parekh et al. |
| 2009/0161732 A1 | 6/2009 | Miller et al. |
| 2009/0191863 A1 | 7/2009 | Kazmi |
| 2009/0252134 A1 | 10/2009 | Schlicht et al. |
| 2009/0258671 A1 | 10/2009 | Kekki et al. |
| 2009/0274096 A1 | 11/2009 | Fu |
| 2009/0323608 A1 | 12/2009 | Adachi et al. |
| 2010/0015923 A1 | 1/2010 | Golitschek |
| 2010/0061496 A1 | 3/2010 | Black et al. |
| 2010/0124940 A1 | 5/2010 | Hassan et al. |
| 2010/0157910 A1 | 6/2010 | Nentwig et al. |
| 2010/0159859 A1 | 6/2010 | Rofougaran |
| 2010/0167741 A1 | 7/2010 | Lee |
| 2010/0195618 A1 | 8/2010 | Park et al. |
| 2010/0195619 A1 | 8/2010 | Bonneville et al. |
| 2010/0195668 A1 | 8/2010 | Robert et al. |
| 2010/0214031 A1 | 8/2010 | Yamamoto et al. |
| 2010/0222060 A1 | 9/2010 | Zhang et al. |
| 2010/0234040 A1 | 9/2010 | Palanki et al. |
| 2010/0240356 A1 | 9/2010 | Lee et al. |
| 2010/0246480 A1 | 9/2010 | Aggarwal et al. |
| 2010/0255849 A1 | 10/2010 | Ore |
| 2010/0260105 A1 | 10/2010 | Keller et al. |
| 2010/0279691 A1 | 11/2010 | Dwyer et al. |
| 2010/0303039 A1 | 12/2010 | Zhang et al. |
| 2010/0322109 A1 | 12/2010 | Ahn et al. |
| 2010/0323622 A1 | 12/2010 | Nentwig |
| 2011/0013530 A1 | 1/2011 | Rinne et al. |
| 2011/0013550 A1 | 1/2011 | Wu |
| 2011/0013578 A1 | 1/2011 | Shimizu et al. |
| 2011/0019556 A1 | 1/2011 | Hsin et al. |
| 2011/0021216 A1 | 1/2011 | Pudney et al. |
| 2011/0064162 A1 | 3/2011 | McCallister et al. |
| 2011/0066429 A1 | 3/2011 | Shperling et al. |
| 2011/0080893 A1 | 4/2011 | Fong et al. |
| 2011/0085497 A1 | 4/2011 | Fang et al. |
| 2011/0086657 A1 | 4/2011 | Koivisto et al. |
| 2011/0103243 A1 | 5/2011 | Larsson et al. |
| 2011/0103330 A1 | 5/2011 | Montojo et al. |
| 2011/0128922 A1 | 6/2011 | Chen et al. |
| 2011/0134831 A1 | 6/2011 | Pirskanen |
| 2011/0149853 A1 * | 6/2011 | Olsson et al. ............... 370/328 |
| 2011/0151913 A1 | 6/2011 | Forster et al. |
| 2011/0164707 A1 | 7/2011 | Luo et al. |
| 2011/0205976 A1 | 8/2011 | Roessel et al. |
| 2011/0217980 A1 | 9/2011 | Faurie et al. |
| 2011/0244870 A1 | 10/2011 | Lee |
| 2011/0267978 A1 | 11/2011 | Etemad |
| 2011/0268045 A1 | 11/2011 | Heo et al. |
| 2011/0269453 A1 | 11/2011 | Ranta-Aho et al. |
| 2011/0276701 A1 | 11/2011 | Purnadi et al. |
| 2011/0310835 A1 | 12/2011 | Cho et al. |
| 2012/0002643 A1 | 1/2012 | Chung et al. |
| 2012/0015656 A1 | 1/2012 | Tiwari |
| 2012/0044844 A1 | 2/2012 | Trainin |
| 2012/0063421 A1 | 3/2012 | Wu |
| 2012/0102162 A1 | 4/2012 | Devireddy |
| 2012/0113982 A1 | 5/2012 | Akselin et al. |
| 2012/0120789 A1 | 5/2012 | Ramachandran et al. |
| 2012/0140743 A1 | 6/2012 | Pelletier et al. |
| 2012/0142367 A1 | 6/2012 | Przybylski |
| 2012/0149377 A1 | 6/2012 | Su et al. |
| 2012/0157101 A1 | 6/2012 | Uemura et al. |
| 2012/0163249 A1 | 6/2012 | Chin et al. |
| 2012/0165019 A1 | 6/2012 | Shintani et al. |

(56) References Cited

U.S. PATENT DOCUMENTS

| | | |
|---|---|---|
| 2012/0195209 A1 | 8/2012 | Jain et al. |
| 2012/0202501 A1 | 8/2012 | Morioka et al. |
| 2013/0017805 A1 | 1/2013 | Andre-Joensson et al. |
| 2013/0044613 A1 | 2/2013 | Edara et al. |
| 2013/0083778 A1 | 4/2013 | Wang |
| 2013/0084870 A1 | 4/2013 | Nylander et al. |
| 2013/0114415 A1 | 5/2013 | Das et al. |
| 2013/0114433 A1 | 5/2013 | Park et al. |
| 2013/0114436 A1 | 5/2013 | Dural et al. |
| 2013/0114473 A1 | 5/2013 | Awoniyi et al. |
| 2013/0114571 A1 | 5/2013 | Das et al. |
| 2013/0115967 A1 | 5/2013 | Soliman et al. |
| 2013/0115991 A1 | 5/2013 | Awoniyi et al. |
| 2013/0115994 A1 | 5/2013 | Awoniyi et al. |
| 2013/0121265 A1 | 5/2013 | Awoniyi et al. |
| 2013/0122921 A1 | 5/2013 | Juppi et al. |
| 2013/0148520 A1 | 6/2013 | Das et al. |
| 2013/0148527 A1 | 6/2013 | Awiniyi et al. |
| 2013/0148576 A1 | 6/2013 | Huang et al. |
| 2013/0148579 A1 | 6/2013 | Das et al. |
| 2013/0148627 A1 | 6/2013 | Das et al. |
| 2013/0148628 A1 | 6/2013 | Das et al. |
| 2013/0148629 A1 | 6/2013 | Das et al. |
| 2013/0150045 A1 | 6/2013 | Das et al. |
| 2013/0176952 A1 | 7/2013 | Shin et al. |
| 2013/0182655 A1 | 7/2013 | Das et al. |
| 2013/0329670 A1 | 12/2013 | Tang et al. |
| 2014/0010170 A1 | 1/2014 | Das et al. |
| 2014/0044431 A1 | 2/2014 | Hussain et al. |
| 2014/0206350 A1 | 7/2014 | Rinne et al. |

FOREIGN PATENT DOCUMENTS

| | | |
|---|---|---|
| EP | 1993237 A2 | 11/2008 |
| EP | 2317816 A1 | 5/2011 |
| EP | 2385653 A2 | 11/2011 |
| EP | 2493257 A1 | 8/2012 |
| GB | 2386506 A | 9/2003 |
| GB | 2421880 A | 7/2006 |
| JP | H08288884 A | 11/1996 |
| JP | H10511818 A | 11/1998 |
| JP | 2002330467 A | 11/2002 |
| JP | 2002344965 A | 11/2002 |
| JP | 2003051849 A | 2/2003 |
| JP | 2003264524 A | 9/2003 |
| JP | 2004173019 A | 6/2004 |
| JP | 2004228927 A | 8/2004 |
| JP | 2004350259 A | 12/2004 |
| JP | 2006094005 A | 4/2006 |
| JP | 2006515119 A | 5/2006 |
| JP | 2006303739 A | 11/2006 |
| JP | 2007074737 A | 3/2007 |
| JP | 2008543222 A | 11/2008 |
| JP | 2008300989 A | 12/2008 |
| JP | 2009060601 A | 3/2009 |
| JP | 2009218638 A | 9/2009 |
| JP | 2009532965 A | 9/2009 |
| JP | 2009545227 A | 12/2009 |
| JP | 2010011397 A | 1/2010 |
| JP | 2010522500 A | 7/2010 |
| JP | 2010226247 A | 10/2010 |
| JP | 2010273318 A | 12/2010 |
| JP | 2011097443 A | 5/2011 |
| JP | 2011521507 A | 7/2011 |
| JP | 2011176687 A | 9/2011 |
| JP | 2012015992 A | 1/2012 |
| JP | 2012525723 A | 10/2012 |
| JP | 2013509055 A | 3/2013 |
| JP | 2013516859 A | 5/2013 |
| JP | 2013524607 A | 6/2013 |
| KR | 20070049091 A | 5/2007 |
| KR | 20070058683 A | 6/2007 |
| KR | 20080034857 A | 4/2008 |
| KR | 20080106092 A | 12/2008 |
| KR | 20090015857 A | 2/2009 |
| KR | 20110067655 A | 6/2011 |
| WO | 9610320 A2 | 4/1996 |
| WO | 9900911 A1 | 1/1999 |
| WO | 0120942 A1 | 3/2001 |
| WO | 03034645 A1 | 4/2003 |
| WO | 03092212 A1 | 11/2003 |
| WO | WO-2004077712 A1 | 9/2004 |
| WO | 2005112566 A2 | 12/2005 |
| WO | WO-2006046307 A1 | 5/2006 |
| WO | 2006110875 A1 | 10/2006 |
| WO | 2006125149 A2 | 11/2006 |
| WO | WO-2006132778 A2 | 12/2006 |
| WO | 2007024748 A2 | 3/2007 |
| WO | WO-2007113319 A1 | 10/2007 |
| WO | 2007148911 A1 | 12/2007 |
| WO | 2008015512 A2 | 2/2008 |
| WO | WO-2008118429 A1 | 10/2008 |
| WO | WO-2009124377 A1 | 10/2009 |
| WO | 2010105232 | 9/2010 |
| WO | WO-2010126418 A1 | 11/2010 |
| WO | 2010141607 | 12/2010 |
| WO | 2010150767 A1 | 12/2010 |
| WO | 2011047619 A1 | 4/2011 |
| WO | 2011053974 | 5/2011 |
| WO | WO-2011082545 A1 | 7/2011 |
| WO | 2011121175 A1 | 10/2011 |
| WO | WO-2013070710 A2 | 5/2013 |
| WO | WO-2013070738 A1 | 5/2013 |
| WO | WO-2013070751 A1 | 5/2013 |

OTHER PUBLICATIONS

3GPP TS 36.304, "3rd Generation Partnership Project; Technical Specification Group Radio Access Network; Evolved Universal Terrestrial Radio Access (E-UTRA); User Equipment (UE) procedures in idle mode (Release 10)"3GPP TS 36.304, 3RD Generation Partnership Project (3GPP), Mobile Competence Centre; 650, Route Des Lucioles; F-06921 Sophia-Antipolis Cedex; France, vol. RAN WG2, no. V10.3.0, Sep. 28, 2011 (Sep. 28, 2011), pp. 1-33, XP050554208, [retrieved on Sep. 28, 2011].

3GPP TS 36.331, "3rd Generation Partnership Project; Technical Specification Group Radio Access Network; Evolved Universal Terrestrial Radio Access (E-UTRA); Radio Resource Control (RRC); Protocol specification (Release 10)", 3GPP Standard; 3GPP TS 36.331, 3rd Generation Partnership Project (3GPP), Mobile Competence Centre ; 650, Route Des Lucioles ; F-06921 Sophia-Antipolis Cedex ; France, vol. RAN WG2, No. V10.3.0, Sep. 30, 2011, pp. 1-296, XP050554294, [retrieved on Sep. 30, 2011].

3GPPTS 36.101, "3rd Generation Partnership Project; Technical Specification Group Radio Access Network; Evolved Universal Terrestrial Radio Access (E-UTRA); User Equipment (UE) radio transmission and reception (Release 10)", (3GPP) Standard; 3GPP TS 36.101, 3rd Generation Partnership Project (3GPP), Mobile Competence Centre ; 650, Route Des Lucioles; F-06921 Sophia-Antipolis Cedex ; France, vol. RAN WG4, No. V10.4.0, Oct. 3, 2011, pp. 1-242, XP050554352, [retrieved on Oct. 3, 2011 ].

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", 3GPP Standard; 3GPP TS 36.300, 3rd Generation Partnership Project (3GPP), Mobile Competence Centre ; 650, Route Des Lucioles ; F-06921 Sophia-Antipolis Cedex; France, vol. RAN WG2, No. V10.5.0, Sep. 28, 2011, XP050554206 , pp. 1-194, [retrieved on Oct. 3, 2011].

International Search Report and Written Opinion—PCT/US2012/063907—ISA/EPO—Mar. 19, 2013.

NEC Group: "Framework to define additional carrier type: Carrier segments", R1-113227, 3rd Generation Partnership Project (3GPP), Mobile Competence Centre ; 350, Route Des Lucioles ; F-06921 Sophia-Antipolis Cedex ; France, vol. RAN WG1, no. Zhuhai; (Oct. 4, 2011),XP050538345.

R2-073069: E-UTRA Cell Selection and Cell Reselection Aspects. 3GPP TSG-RAN WG2 Meeting #59 [Online] 2007, pp. 1-11.

(56) References Cited

OTHER PUBLICATIONS

Co-Pending U.S. Appl. No. 13/707,111, filed Dec. 6, 2012.
Co-pending U.S. Appl. No. 13/363,538, filed Feb. 1, 2012.
Huawei, "R2-084311: Scaling measurement and cell reselection parameters," 3GPP TSG RAN WG2 #63 [Online] 2008, pp. 1-8.
Li, et al., "Mobility management: from GPRS to UMTS," Wireless Communications and Mbile Cmputing, 2001, pp. 339-359.
3GPP TS 23.009 V11.0.0 (Sep. 2011), 3rd Generation Partnership Project; Technical Specification Group Core Network and Terminals; Handover procedures (Release 11).
3GPP TS 25.213 "3rd Generation Partnership Project; Technical Specification Group Radio Access Network; Spreading and modulation," version 9.2.0, release 9, Sep. 2010.
3GPP TS 25.331 v11.0.0 (Dec. 2011), 3rd Generation Partnership Project; Technical Specification Group Radio Access Network; Radio Resource Control (RRC); Protocol specification (Release 11).
3GPP TS 25.413 V10.5.0 (Mar. 2012), 3rd Generation Partnership Project; Technical Specification Group Radio Access Network; UTRAN lu interface, Radio Access Network Application Part (RANAP) signalling (Release 10).
3GPP TS 34.108 V9.6.0 (Sep. 2011), 3rd Generation Partnership Project; Technical Specification Group Radio Access Network; Common test environments for User Equipment (UE); Conformance testing (Release 9).
3rd Generation Partnership Project; Technical Specification Group Radio Access Network; Evolved Universal Terrestrial Radio Access (E-UTRA); Relay architectures for E-UTRA (LTE-Advanced) (Release 9), 3GPP Standard; 3GPP TR 36.806, 3rd Generation Partnership Project (3GPP), Mobile Competence Centre; 650, Route Des Lucioles; F-06921 Sophia-Antipolis Cedex; France, No. V9.0.0, Apr. 21, 2010, pp. 1-34, XP050402561, [retrieved on Apr. 21, 2010].
"3rd Generation Partnership Project; Technical Specification Group Services and System Aspects; Circuit Switched (CS) fallback, in Evolved Packet System (EPS); Stage 2 (Release 10)", 3GPP Standard; 3GPP TS 23.272, 3rd Generation Partnership Project (3GPP), Mobile Competence Centre ; 650, Route Des Lucioles ; F-06921 Sophiaantipolis Cedex ; France, vol. SA WG2, no. V10.5.0, Aug. 24, 2011, pp. 1-79, XP050553745, [retrieved on Aug. 24, 2011].
"3rd Generation Partnership Project; Technical Specification Group Services and System Aspects; Single Radio Voice Call Continuity (SRVCC); Stage 2 (Release 11)", 3GPP Standard; 3GPP TS 23.216, 3rd Generation Partnership Project (3GPP), Mobile Competence Centre ; 650, Route Des Lucioles ; F-06921 Sophiaantipolis Cedex ; France, vol. SA WG2; No. V11.2.0, Aug. 24, 2011, pp. 1-53, XP050553738, [retrieved on Aug. 24, 2011].
Abeta S., "Toward LTE commercial launch and future plan for LTE enhancements (LTE-Advanced)", Communication Systems (ICCS), 2010 IEEE International Conference on, IEEE, Piscataway, NJ, USA, Nov. 17, 2010, pp. 146-150, XP031848276, ISBN: 978-1-4244-7004-4.
Arjona A., et al., "Live network Performance Challenge FLASH-OFDM Vs HSDPA," 22nd International Conference on Advanced Information Networking and Applications, 2008, pp. 918-925.
Black, et al., "Interference Cancellation Techniques for CDMA2000 1x Reverse Link", IEEE Globecom 2009, Global Telecommunications Conference, 2009, 5 pages.
Co-pending U.S. Appl. No. 14/091,933, filed Nov. 27, 2013.
Ericsson: "LTE Spurious emission concept for flexible bandwidth", 3GPP Draft; R4-051130, 3rd Generation Partnership Project (3GPP), Mobile Competence Centre, 650, Route Des Lucioles; F-06921 Sophia-Antipolis Cedex; France, vol. RAN WG4, no. Seoul, Korea; Nov. 3, 2005, XP050174721.

Gessner C., et al., "Voice and SMS in LTE White Paper," Rohde & Schwarz GmbH & Co. KG, 2011, pp. 1-45.
Holma, H., et al., "WCDMA for UMTS—HSPA Evolution and LTE (4th Edition)" In: "WCDMA for UMTS—HSPA Evolution and LTE (4th Edition)", Jan. 1, 2007, John Wiley & Sons Ltd., UK, XP055052236, ISBN: 978-0-47-031933-8 ,pp. 74-75.
IEEE Std 802.11tm-2007: "IEEE Standard for Information technology—Telecommunications and Information exchange between systems—Local and metropolitan area networks—Specific requirements Part 11: Wireless LAN Medium Access Control (MAC) and Physical Layer (PHY) Specifications," 2007, pp. 1-98.
International Search Report and Written Opinion—PCT/US2012/063895—ISA/EPO—May 13, 2013.
International Search Report and Written Opinion—PCT/US2012/063903—ISA/EPO—Mar. 22, 2013.
International Search Report and Written Opinion—PCT/US2012/068530—ISA/EPO—Feb. 20, 2013.
International Search Report and Written Opinion—PCT/US2012/068533—ISA/EPO—Feb. 12, 2013.
International Search Report and Written Opinion—PCT/US2012/068537—ISA/EPO—Feb. 13, 2013.
International Search Report and Written Opinion—PCT/US2012/068544—ISA/EPO—Feb. 14, 2013.
International Search Report and Written Opinion—PCT/US2012/068523—ISA/EPO—Feb. 5, 2013.
Klerer M., "Introduction to IEEE 802.20," Technical and procedural Orientation, IEEE 802.20—PD-04, Mar. 10, 2003, pp. 1-44.
Marks R.B., "The IEEE 802.16 Wireless MAN Standard for Broadband Wireless Metropolitan Area Networks," Apr. 16, 2003, pp. 1-57.
Qunhui C., "Evolution and deployment of VoLTE", Huawei Communicate, Sep. 1, 2011, XP055052291, p. 52-p. 55.
Samsung: "FDD/TDD dual mode UE capability handling", 3GPP DRAFT; 36331_CRXXXX_(REL-10)_R2-116035 FDD TDD Dual Mode UE, 3rd Generation Partnership Project (3GPP), Mobile Competence Centre ; 650, Route Des Lucioles ; F-06921 Sophia-Antipolis Cedex ; France, vol. RAN WG2, no. San Francisco, USA; Nov. 14, 2011-Nov. 19, 2011, Nov. 7, 2011, XP050564131, [retrieved on Nov. 7, 2011].
"Understanding CS Fallback in LTE", Sep. 27, 2009, XP055052327.
ZTE: "Discussion on activation and deactivation", 3GPP DRAFT; R2-103719, 3rd Generation Partnership Project (3GPP), Mobile Competence Centre ; 650, Route Des Lucioles ; F-06921 Sophia-Antipolis Cedex ; France, vol. RAN WG2, no. Stockholm, Sweden; Jun. 28, 2010, Jun. 22, 2010, XP050451195, [retrieved on Jun. 22, 2010].
Qualcomm Incorporated: "Flexible Bandwidth Usage for UMTS FDD", 3GPP Draft; R1-125194 Flexible Bandwidth Usage UMTS_FDD, 3rd Generation Partnership Project—(3GPP), Mobile Competence Centre ; 650, Route Des Lucioles ; F-06921 Sophia-Antipolis Cedex ; France vol. RAN WG1, no. New Orleans, USA; Nov. 12, 2012-Nov. 16, 2012 Nov. 3, 2012, XP050663037, Retrieved from the Internet: URL:http://www.3gpp.org/ftp/tsgran/WG1RL 1/TSGR1_71/Docs/.
Qualcomm Incorporated, "Use Cases for Extension Carriers," 3GPP TSG-RAN WG1 #66bis, R1-113382, Oct. 2011, pp. 1-3, URL,http://www.3gpp.org/ftp/tsg_ran/WG1_RL1/TSGR1_66b/Docs/R1-113382.zip.
ZTE: "Introduction of Additional Carrier Types", 3GPP TSG-RAN WG1 Meeting #66 R1-112248, URL: http://www.3gpp.org/ftp/tsg_ran/WG1_RL1/TSGR1_66/Docs/R1-112248.zip, Aug. 16, 2011, pp. 1-4.

* cited by examiner

| Cases | Handover/Reselection Scenario 510 | Deployment Scenarios 520 |
|---|---|---|
| Case 1 | UE may move from Carrier A with N = x to Carrier B with N = x, x ≠ 1 (e.g., same flexible bandwidth carrier) | Inter-Frequency Intra-Frequency |
| Case 2 | UE may move from Carrier A with N = x to Carrier B with N = y, y ≠ 1 & x ≠ x, y ≠ x (e.g., different flexible bandwidth carrier) | Inter-Frequency |
| Case 3 | UE moves from Carrier A with N ≠ 1 to Carrier B with N = 1 (e.g., flexible to normal bandwidth carrier) | Inter-Frequency |
| Case 4 | UE moves from Carrier A with N = 1 to Carrier B with N ≠ 1 (e.g., normal to flexible bandwidth carrier) | Inter-Frequency |
| Case 5 | UE moves from Carrier A (e.g., GSM) to Carrier B with N≠1 (e.g., GSM to flexible bandwidth carrier) | Inter-RAT |
| Case 6 | UE moves from Carrier A with N ≠ 1 to Carrier B (e.g., GSM) (e.g., flexible bandwidth carrier to GSM) | Inter-RAT |

FIG. 5

ASSISTANCE INFORMATION FOR FLEXIBLE BANDWIDTH CARRIER MOBILITY METHODS, SYSTEMS, AND DEVICES

CROSS-RELATED APPLICATIONS

The present application for patent claims priority to Provisional Application No. 61/556,777 entitled "FRACTIONAL SYSTEMS IN WIRELESS COMMUNICATIONS" filed Nov. 7, 2011, and assigned to the assignee hereof and hereby expressly incorporated by reference herein for all purposes. The present application for patent also claims priority to Provisional Application No. 61/568,742 entitled "SIGNAL CAPACITY BOOSTING, COORDINATED FORWARD LINK BLANKING AND POWER BOOSTING, AND REVERSE LINK THROUGHPUT INCREASING FOR FLEXIBLE BANDWIDTH SYSTEMS" filed Dec. 9, 2011, and assigned to the assignee hereof and hereby expressly incorporated by reference herein for all purposes. The present application for patent also claims priority to Provisional Application No. 61/607,502 entitled "MOBILITY MANAGEMENT FOR FLEXIBLE BANDWIDTH SYSTEMS AND DEVICES" filed Mar. 6, 2012, and assigned to the assignee hereof and hereby expressly incorporated by reference herein for all purposes.

BACKGROUND

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, 3GPP Long Term Evolution (LTE) systems, and orthogonal frequency-division multiple access (OFDMA) systems.

Service providers are typically allocated blocks of frequency spectrum for exclusive use in certain geographic regions. These blocks of frequencies are generally assigned by regulators regardless of the multiple access technology being used. In most cases, these blocks are not integer multiple of channel bandwidths, hence there may be unutilized parts of the spectrum. As the use of wireless devices has increased, the demand for and value of this spectrum has generally surged, as well. Nonetheless, in some cases, wireless communications systems may not utilize portions of the allocated spectrum because the portions are not big enough to fit a standard or normal waveform. The developers of the LTE standard, for example, recognized the problem and decided to support 6 different system bandwidths, namely 1.4, 3, 5, 10, 15 and 20 MHz. Another approach may be to utilize flexible bandwidth carrier systems that may involve wireless communications systems that utilize portions of spectrum that may not fit a normal waveform. However, different mobility management issues may arise when utilizing flexible bandwidth carrier systems, such as facilitating migration between mixed legacy and flexible bandwidth carrier systems.

SUMMARY

Methods, systems, and devices for mobility management for wireless communications systems that utilize a flexible bandwidth carrier are provided. Some embodiments include determining and transmitting assistance information to one or more user equipment (UEs) to facilitate mobility management with respect to the flexible bandwidth carrier. Some embodiments include transmitting flexible bandwidth carrier information to UEs utilizing: UE-centric approaches, network-centric approaches, network-centric approaches with PLMN, new SIB creation approaches, and/or application layer approaches. Some embodiments include methods, systems, and devices for receiving and utilizing assistance information for one or more UEs to facilitate mobility management with respect to a flexible bandwidth carrier.

Some embodiments provide mobility management for mixed legacy and/or flexible bandwidth carrier systems. Flexible bandwidth carrier systems may involve wireless communications systems that may utilize portions of spectrum that may not be big enough to fit a normal waveform utilizing flexible waveforms. A flexible bandwidth carrier system may be generated with respect to a normal bandwidth carrier system through dilating, or scaling down, the time or the chip rate of the flexible bandwidth carrier system with respect to the normal bandwidth carrier system. In some embodiments, a flexible bandwidth carrier system may be generated with respect to a normal bandwidth carrier system through dilating the frame lengths, or scaling down, the bandwidth of the flexible bandwidth carrier system with respect to the normal bandwidth carrier system. Some embodiments increase the bandwidth of a flexible waveform through expanding, or scaling up the time or the chip rate of the flexible bandwidth carrier system. Some embodiments increase the bandwidth of a flexible waveform through decreasing the frame lengths, or scaling up the bandwidth of the flexible bandwidth carrier system.

Some embodiments include a method of mobility management for wireless communications systems. The method may include: determining assistance information regarding a first flexible bandwidth carrier for one or more user equipment (UEs) to facilitate mobility management, where a bandwidth scaling factor is utilized to generate a first flexible bandwidth for the first flexible bandwidth carrier; and/or transmitting the assistance information regarding the first flexible bandwidth carrier to the one or more UEs to facilitate the mobility management.

Transmitting the assistance information regarding the first flexible bandwidth carrier for the one or more UEs to facilitate the mobility management may include transmitting the bandwidth scaling factor associated with the first flexible bandwidth carrier for the one or more UEs to facilitate the mobility management. Transmitting the assistance information regarding the first flexible bandwidth carrier for the one or more UEs to facilitate the mobility management may include transmitting assistance information consistent with a UE-centric approach including at least one or more identifiers of the first flexible bandwidth carrier, wherein the one or more identifiers include at least a carrier frequency or a Primary Scrambling Code of the first flexible bandwidth carrier. Transmitting the assistance information regarding the first flexible bandwidth carrier for the one or more UEs to facilitate the mobility management may include transmitting assistance information consistent with a network-centric approach including at least one or more bandwidth scaling factors associated with the first flexible bandwidth carrier. Transmitting the assistance information regarding the first flexible bandwidth carrier for the one or more UEs to facilitate the mobility management may include transmitting assistance information consistent with a network-centric approach including one or more PLMN IDs to identify the first flexible bandwidth carrier. Transmitting the assistance information regarding the first flexible bandwidth carrier for the one or more UEs to facilitate the mobility management may include transmitting one or more SIBs to convey the assistance information regarding the first flexible bandwidth carrier. Transmitting the assistance information regarding the first flexible bandwidth carrier for the one or more UEs to facilitate the mobility management may include transmitting application layer-based information including at least SMS, data messages, or OMA Device Management message with assistance information associated with the first flexible bandwidth carrier.

In some embodiments, the assistance information to facilitate the mobility management facilitates mobility between the first flexible bandwidth carrier and a second flexible bandwidth carrier, wherein the first flexible bandwidth carrier and the second flexible bandwidth carrier utilize the same bandwidth scaling factor. The assistance information to facilitate the mobility management may facilitate mobility between the first flexible bandwidth carrier and a second flexible bandwidth carrier, wherein the first flexible bandwidth carrier and the second flexible bandwidth carrier utilize different bandwidth scaling factors. The assistance information to facilitate the mobility management may facilitate mobility between the first flexible bandwidth carrier and a normal bandwidth carrier.

Some embodiments include determining assistance information regarding at least a second flexible bandwidth carrier for the UEs to facilitate the mobility management, where a second bandwidth scaling factors is utilized to generate a flexible bandwidth for the second flexible bandwidth carrier. The assistance information regarding at least the second flexible bandwidth carrier may be transmitted to the one or more UEs to facilitate the mobility management.

Transmitting the assistance information regarding the first flexible bandwidth carrier to the one or more UEs to facilitate the mobility management may include transmitting the assistance information over a first bandwidth carrier different from the first flexible bandwidth carrier. Transmitting the assistance information over the first bandwidth carrier different from the first flexible bandwidth carrier may include transmitting the assistance information over a normal bandwidth carrier. Transmitting the assistance information over the first bandwidth carrier different from the first flexible bandwidth carrier may include transmitting the assistance information over a second flexible bandwidth carrier. In some embodiments, the first flexible bandwidth carrier is associated with a first flexible bandwidth cell.

Some embodiments include a method of mobility management for wireless communications systems. The method may include: receiving assistance information regarding a first flexible bandwidth carrier to facilitate the mobility management, wherein a bandwidth scaling factor is utilized to generate a first flexible bandwidth for the first flexible bandwidth carrier; and/or utilizing the assistance information regarding the first flexible bandwidth carrier to facilitate the mobility management.

Receiving the assistance information regarding the first flexible bandwidth carrier to facilitate mobility the management may include receiving the bandwidth scaling factor associated with the first flexible bandwidth carrier to facilitate the mobility management. Receiving the assistance information regarding the first flexible bandwidth carrier to facilitate the mobility management may include receiving assistance information consistent with a UE-centric approach including at least one or more identifiers of the first flexible bandwidth carrier, wherein the one or more identifiers include at least a carrier frequency or a Primary Scrambling Code of the first flexible bandwidth carrier. Receiving the assistance information regarding the first flexible bandwidth carrier to facilitate the mobility management may include receiving assistance information consistent with a network-centric approach including at least one or more bandwidth scaling factors associated with the first flexible bandwidth carrier. Receiving the assistance information regarding the first flexible bandwidth carrier to facilitate the mobility management may include receiving assistance information consistent with a network centric approach including one or more PLMN IDs to identify the first flexible bandwidth carrier. Receiving the assistance information regarding the first flexible bandwidth carrier to facilitate the mobility management may include receiving one or more SIBs that convey the assistance information regarding the first flexible bandwidth carrier. Receiving the assistance information regarding the first flexible bandwidth carrier to facilitate the mobility management may include receiving application layer based information including at least SMS, data messages, or OMA Device Management message with assistance information associated with the first flexible bandwidth carrier.

The assistance information to facilitate the mobility management may facilitate mobility between the first flexible bandwidth carrier and a second flexible bandwidth carrier, wherein the first flexible bandwidth carrier and the second flexible bandwidth carrier utilize the same bandwidth scaling factor. The assistance information to facilitate the mobility management may facilitate mobility between the first flexible bandwidth carrier and a second flexible bandwidth carrier, wherein the first flexible bandwidth carrier and the second flexible bandwidth carrier utilize different bandwidth scaling factors. The assistance information to facilitate the mobility management may facilitate mobility between the flexible bandwidth carrier and a normal bandwidth carrier.

Some embodiments include receiving assistance information regarding at least a second flexible bandwidth carrier to facilitate the mobility management, wherein a second bandwidth scaling factors is utilized to generate a flexible bandwidth for the second flexible bandwidth carrier; and/or utilizing the assistance information regarding at least the second flexible bandwidth carrier to facilitate the mobility management.

Receiving the assistance information regarding the first flexible bandwidth carrier to facilitate the mobility management may include receiving the assistance information over a first bandwidth carrier different from the first flexible bandwidth carrier. Receiving the assistance information over the first bandwidth carrier different from the first flexible bandwidth carrier may include receiving the assistance information over a normal bandwidth carrier. Receiving the assistance information over the first bandwidth carrier different from the first flexible bandwidth carrier may include receiving the assistance information over a second flexible bandwidth carrier. The first flexible bandwidth carrier may be associated with a first flexible bandwidth cell. Receiving the assistance information and utilizing the assistance information may occur at a user equipment (UE).

Some embodiments include a wireless communications system configured for mobility management for wireless communications. The system may include: means for determining assistance information regarding a first flexible bandwidth carrier for one or more user equipment (UEs) to facilitate the mobility management, wherein a bandwidth scaling factor is utilized to generate a first flexible bandwidth for the first flexible bandwidth carrier; and/or means for transmitting the assistance information regarding the first flexible bandwidth carrier to the one or more UEs to facilitate the mobility management.

The wireless communications system may further include: means for determining assistance information regarding at least a second flexible bandwidth carrier for the one or more UEs to facilitate the mobility management, wherein a second bandwidth scaling factors is utilized to generate a flexible bandwidth for the second flexible bandwidth carrier; and/or means for transmitting the assistance information regarding at least the second flexible bandwidth carrier to the one or more UEs to facilitate the mobility management. The means for transmitting the assistance information regarding the first flexible bandwidth carrier to the one or more UEs to facilitate the mobility management may include means for transmitting the assistance information over a first bandwidth carrier different from the first flexible bandwidth carrier. The means for transmitting the assistance information over the first bandwidth carrier different from the first flexible bandwidth carrier may include means for transmitting the assistance information over a normal bandwidth carrier. The means for transmitting the assistance information over the first bandwidth carrier different from the first flexible bandwidth carrier may include means for transmitting the assistance information over a second flexible bandwidth carrier.

Some embodiments include a computer program product for mobility management for wireless communications systems that may include a non-transitory computer-readable medium that may include: code for determining assistance information regarding a first flexible bandwidth carrier for one or more user equipment (UEs) to facilitate the mobility management, where a bandwidth scaling factor is utilized to generate a first flexible bandwidth for the first flexible bandwidth carrier; and/or code for transmitting the assistance information regarding the first flexible bandwidth carrier to the one or more UEs to facilitate the mobility management.

The non-transitory computer-readable medium may include: code for determining assistance information regarding at least a second flexible bandwidth carrier for the one or more UEs to facilitate the mobility management, wherein a second bandwidth scaling factors is utilized to generate a flexible bandwidth for the second flexible bandwidth carrier; and/or code for transmitting the assistance information regarding at least the second flexible bandwidth carrier to the one or more UEs to facilitate the mobility management.

The code for transmitting the assistance information regarding the first flexible bandwidth carrier to the one or more UEs to facilitate the mobility management may include code for transmitting the assistance information over a first bandwidth carrier different from the first flexible bandwidth carrier. The code transmitting the assistance information over the first bandwidth carrier different from the first flexible bandwidth carrier may include code for transmitting the assistance information over a normal bandwidth carrier. The code for transmitting the assistance information over the first bandwidth carrier different from the first flexible bandwidth carrier may include code for transmitting the assistance information over a second flexible bandwidth carrier.

Some embodiments include a wireless communications device configured for mobility management for wireless communications systems. The device may include at least one processor that may be configured to: determine assistance information regarding a first flexible bandwidth carrier for one or more user equipment (UEs) to facilitate the mobility management, wherein a bandwidth scaling factor is utilized to generate a first flexible bandwidth for the first flexible bandwidth carrier; and/or transmit the assistance information regarding the first flexible bandwidth carrier to the one or more UEs to facilitate the mobility management. The device may also include at least one memory coupled with the at least one processor.

The at least one processor may be further configured to: determine assistance information regarding at least a second flexible bandwidth carrier for the one or more UEs to facilitate the mobility management, wherein a second bandwidth scaling factors is utilized to generate a flexible bandwidth for the second flexible bandwidth carrier; and/or transmit the assistance information regarding at least the second flexible bandwidth carrier to the one or more UEs to facilitate the mobility management. The at least one processor configured to transmit the assistance information regarding the first flexible bandwidth carrier to the one or more UEs to facilitate the mobility management may be configured to transmit the assistance information over a first bandwidth carrier different from the first flexible bandwidth carrier. The at least one processor configured to transmit the assistance information over the first bandwidth carrier different from the first flexible bandwidth carrier may be configured to transmit the assistance information over a normal bandwidth carrier. The at least one processor configured to transmit the assistance information over the first bandwidth carrier different from the first flexible bandwidth carrier may be configured to transmit the assistance information over a second flexible bandwidth carrier.

Some embodiments a wireless communications system configured for mobility management for wireless communications. The system may include: means for receiving assistance information regarding a first flexible bandwidth carrier to facilitate the mobility management, wherein a bandwidth scaling factor is utilized to generate a first flexible bandwidth for the first flexible bandwidth carrier; and/or means for utilizing the assistance information regarding the first flexible bandwidth carrier to facilitate the mobility management.

The means for receiving the assistance information regarding the first flexible bandwidth carrier to facilitate the mobility management may include means for receiving the assistance information over a first bandwidth carrier different from the first flexible bandwidth carrier. The means for receiving the assistance information over the first bandwidth carrier different from the first flexible bandwidth carrier may include means for receiving the assistance information over a normal bandwidth carrier. The means for receiving the assistance information over the first bandwidth carrier different from the first flexible bandwidth carrier may include means for receiving the assistance information over a second flexible bandwidth carrier.

Some embodiments include a computer program product for mobility management for wireless communications systems that may include a non-transitory computer-readable medium that may include: code for receiving assistance information regarding a first flexible bandwidth carrier to facilitate the mobility management, wherein a bandwidth scaling factor is utilized to generate a first flexible bandwidth for the first flexible bandwidth carrier; and/or code for utilizing the assistance information regarding the first flexible bandwidth carrier to facilitate the mobility management.

The code for receiving the assistance information regarding the first flexible bandwidth carrier to facilitate the mobility management may include code for receiving the assistance information over a first bandwidth carrier different from the first flexible bandwidth carrier. The code for receiving the assistance information over the first bandwidth carrier different from the first flexible bandwidth carrier may include code for receiving the assistance information over a normal bandwidth carrier. The code for receiving the assistance information over the first bandwidth carrier different from the first flexible bandwidth carrier may include code for receiving the assistance information over a second flexible bandwidth carrier.

Some embodiments include wireless communications device configured for mobility management for wireless communications systems. The device may include at least one processor that may be configured to: receive assistance information regarding a first flexible bandwidth carrier to facilitate the mobility management, wherein a bandwidth scaling factor is utilized to generate a first flexible bandwidth for the first flexible bandwidth carrier; and/or utilize the assistance information regarding the first flexible bandwidth carrier to facilitate the mobility management. The device may include at least one memory coupled with the at least one processor.

The at least one processor configured to receive the assistance information regarding the first flexible bandwidth carrier to facilitate the mobility management may be configured to receive the assistance information over a first bandwidth carrier different from the first flexible bandwidth carrier. The at least one processor configured to receive the assistance information over the first bandwidth carrier different from the first flexible bandwidth carrier may be configured to receive the assistance information over a normal bandwidth carrier. The at least one processor configured to receive the assistance information over the first bandwidth carrier different from the first flexible bandwidth carrier is configured may be configured to receive the assistance information over a second flexible bandwidth carrier.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 5 shows a table that includes several mobility management scenarios in accordance with various embodiments;

DETAILED DESCRIPTION

Figure 1:
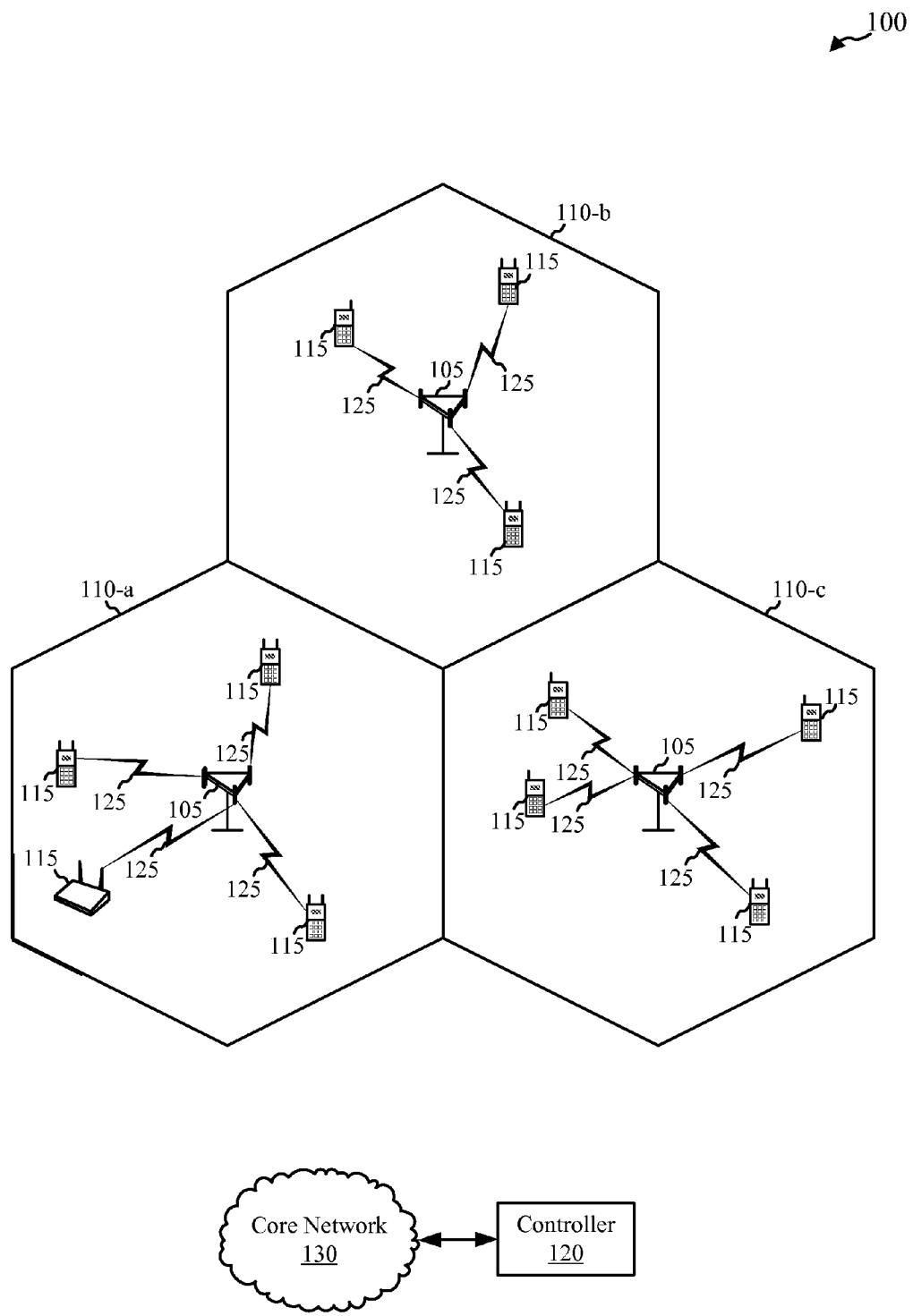
FIG. 1 shows a block diagram of a wireless communications system in accordance with various embodiments.

Methods, systems, and devices for mobility management for wireless communications systems that utilize flexible bandwidth are provided. Some embodiments include determining and transmitting assistance information to one or more user equipment (UEs) to facilitate mobility management with respect to a flexible bandwidth carrier. Some embodiments include transmitting flexible bandwidth carrier information to UEs utilizing: UE-centric approaches, network-centric approaches, network-centric approaches with PLMN, new SIB creation approaches, and/or application layer approaches. Some embodiments include methods, systems, and devices for receiving and utilizing assistance information for one or more UEs to facilitate mobility management with respect to a flexible bandwidth carrier.

Some embodiments include one or more flexible bandwidth carrier networks that may be designed for low data rate applications and may be used also in soft re-framing scenarios. In a mixed legacy and flexible bandwidth carrier deployment (e.g., GSM, WCDMA, and/or flexible bandwidth carrier networks), multi-mode flexible bandwidth UEs may be able to migrate between these networks. Embodiments address different issues that may arise in these mixed systems including, but not limited to: the impacts of the mobility management procedure with respect to deploying a flexible bandwidth carrier or cell in network with existing systems, such as UMTS or GSM; and/or network signaling of information about a flexible bandwidth carrier or cell to flexible bandwidth UEs. Embodiments may provide a variety of pre-standard and potential standard solutions for enabling flexible bandwidth UE mobility between the flexible bandwidth carrier and legacy networks.

Flexible bandwidth carrier systems may involve wireless communications systems that may utilize portions of spectrum that may not be big enough to fit a normal waveform utilizing flexible waveforms. A flexible bandwidth carrier system may be generated with respect to a normal bandwidth carrier system through dilating, or scaling down, the time or the chip rate of the flexible bandwidth carrier system with respect to the normal bandwidth carrier system. In some embodiments, a flexible bandwidth carrier system may be generated with respect to a normal bandwidth carrier system through dilating the frame lengths, or scaling down, the bandwidth of the flexible bandwidth carrier system with respect to the normal bandwidth carrier system. Some embodiments increase the bandwidth of a flexible waveform through expanding, or scaling up the time or the chip rate of the flexible bandwidth carrier system. Some embodiments increase the bandwidth of a flexible waveform through decreasing the frame lengths, or scaling up the bandwidth of the flexible bandwidth carrier system.

Techniques described herein may be used for various wireless communications systems such as CDMA, TDMA, FDMA, OFDMA, SC-FDMA, Peer-to-Peer, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA or OFDM system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a block diagram illustrates an example of a wireless communications system 100 in accordance with various embodiments. The system 100 includes base stations 105, user equipment 115, a base station controller 120, and a core network 130 (the controller 120 may be integrated into the core network 130 in some embodiments; in some embodiments, controller 120 may be integrated into base stations 105). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, Time Division Multiple Access (TDMA) signal, Frequency Division Multiple Access (FDMA) signal, Orthogonal FDMA (OFDMA) signal, Single-Carrier FDMA (SC-FDMA) signal, etc. Each modulated signal may be sent on a different carrier and may carry control information (e.g., pilot signals), overhead information, data, etc. The system 100 may be a multi-carrier LTE network capable of efficiently allocating network resources.

The user equipment 115 may be any type of mobile station, mobile device, access terminal, subscriber unit, or user equipment. The user equipment 115 may include cellular phones and wireless communications devices, but may also include personal digital assistants (PDAs), smartphones, other handheld devices, netbooks, notebook computers, etc. Thus, the term user equipment should be interpreted broadly hereinafter, including the claims, to include any type of wireless or mobile communications device.

The base stations 105 may wirelessly communicate with the user equipment 115 via a base station antenna. The base stations 105 may be configured to communicate with the user equipment 115 under the control of the controller 120 via multiple carriers. In GSM, for example, the controller 120 may be referred to as the base station controller (BSC); in UMTS, the controller may be known as the Radio Network Controller (RNC). Each of the base station 105 sites can provide communication coverage for a respective geographic area. In some embodiments, base stations 105 may be referred to as a NodeB, eNodeB, Home NodeB, and/or Home eNodeB. The coverage area for each base station 105 here is identified as 110-$a$, 110-$b$, or 110-$c$. The coverage area for a base station may be divided into sectors (not shown, but making up only a portion of the coverage area). The system 100 may include base stations 105 of different types (e.g., macro, micro, femto, and/or pico base stations).

The different aspects of system 100, such as the user equipment 115, the base stations 105, the core network 130, and/or the controller 120 may be configured to utilize flexible bandwidth carriers and waveforms in accordance with various embodiments. System 100, for example, shows transmissions 125 between user equipment 115 and base stations 105. The transmissions 125 may include uplink and/or reverse link transmission, from a user equipment 115 to a base station 105, and/or downlink and/or forward link transmissions, from a base station 105 to a user equipment 115. The transmissions 125 may include flexible and/or normal waveforms. Normal waveforms may also be referred to as legacy and/or normal waveforms.

The different aspects of system 100, such as the user equipment 115, the base stations 105, the core network 130, and/or the controller 120 may be configured to utilize flexible bandwidth and waveforms in accordance with various embodiments. For example, different aspects of system 100 may utilize portions of spectrum that may not be big enough to fit a normal waveform. Devices such as the user equipment 115, the base stations 105, the core network 130, and/or the controller 120 may be configured to adapt the chip rates and/or scaling factors to generate and/or utilize flexible bandwidth and/or waveforms. Some aspects of system 100 may form a flexible subsystem (such as certain user equipment 115 and/or base stations 105) that may be generated with respect to a normal subsystem (that may be implemented using other user equipment 115, controller 120, and/or base stations 105 through dilating, or scaling down, the time or the chip rate of the flexible subsystem with respect to the normal subsystem. In some embodiments, a flexible subsystem may be generated with respect to a normal subsystem through dilating the frame lengths, or scaling down, the bandwidth of the flexible subsystem with respect to the normal subsystem. Some embodiments increase the bandwidth of a flexible waveform through expanding, or scaling up the time or the chip rate of the flexible subsystem. Some embodiments increase the bandwidth of a flexible waveform through decreasing the frame lengths, or scaling up the bandwidth of the flexible subsystem.

In some embodiments, the different aspects of system 100, such as the user equipment 115, the base stations 105, the core network 130, and/or the controller 120 may be configured for signaling and/or receiving assistance information to one or more user equipment, referred herein as user equipment (UEs) to facilitate mobility management with respect to a flexible bandwidth carrier or cell, which may be associated base stations 105. In some embodiments, a network and/or base station 105 may provide assistance information to UEs 115 by: provisioning, broadcast messages, and/or dedicated messages. Some embodiments may include signaling and/or broadcasting flexible bandwidth carrier or cell information to UEs 115 utilizing, but not limited, to the following approaches: UE-centric approaches, network-centric approaches, network-centric approaches with PLMN, new SIB creation approaches, and/or application layer approaches.

In some embodiments, a base station 105 may be configured for determining assistance information regarding a first flexible bandwidth carrier for one or more user equipment 115 to facilitate mobility management. The bandwidth scaling factor may be utilized to generate a first flexible bandwidth for the first flexible bandwidth carrier. A base station 105 may be configured for transmitting the assistance information regarding the first flexible bandwidth carrier to the one or more user equipment 115 to facilitate mobility management.

Some embodiments include configuring one or more user equipment 115 for mobility management within wireless communications system 100. For example, a user equipment 115 may be configured for receiving assistance information regarding a first flexible bandwidth carrier to facilitate mobility management. A bandwidth scaling factor may be utilized to generate a first flexible bandwidth for the first flexible bandwidth carrier. A user equipment 115 may be configured for utilizing the assistance information regarding the first flexible bandwidth carrier to facilitate mobility management.

In some embodiments, the assistance information to facilitate mobility management facilitates mobility between the first flexible bandwidth carrier and a second flexible bandwidth carrier, or other flexible bandwidth carriers for a user equipment 115. The first flexible bandwidth carrier and the second flexible bandwidth carrier may utilize the same bandwidth scaling factor. The first flexible bandwidth carrier and the second flexible bandwidth carrier may utilize different bandwidth scaling factors. The assistance information to facilitate mobility management may facilitate mobility between the flexible bandwidth carrier and a normal bandwidth carrier.

Some embodiments may include user equipment 115 and/or base stations 105 that may generate flexible waveforms and/or normal waveforms. Flexible waveforms may occupy less bandwidth than a normal waveform. For example, at a band edge, there may not be enough available spectrum to place a normal waveform. For a flexible waveform in some embodiments, as time gets dilated, the frequency occupied by a waveform goes down, thus making it possible to fit a flexible waveform into spectrum that may not be broad enough to fit a normal waveform. Flexible waveforms may also be generated in some embodiments through using a scaling factor. In some embodiments, a flexible bandwidth carrier may be utilized to carry the flexible waveform. Other embodiments may generate a flexible waveform to fit a portion of spectrum through altering a rate or chip rate (e.g., a spreading factor may change). Some embodiments may change a frequency of processing to change a chip rate or utilize a scaling factor. Changing frequency of processing may include changing an interpolation rate, an interrupt rate, and/or a decimation rate. In some embodiments, a chip rate may be changed or a scaling factor utilized through filtering, by decimation, and/or by changing a frequency of an ADC, a DAC, and/or an offline clock. A divider may be used to change the frequency of at least one clock. In some embodiments, a chip rate divider (Dcr) may be utilized. In some embodiments, a scaling factor for a flexible bandwidth carrier may be referred to as a bandwidth scaling factor.

In some embodiments, a flexible system or waveform may be a fractional system or waveform. Fractional systems and/or waveforms may or may not change bandwidth for example. A fractional system or waveform may be flexible because it may offer more possibilities than a normal system or waveform (e.g., N=1 system). A normal system or waveform may refer to a standard and/or legacy system or waveform.

Figure 2A:
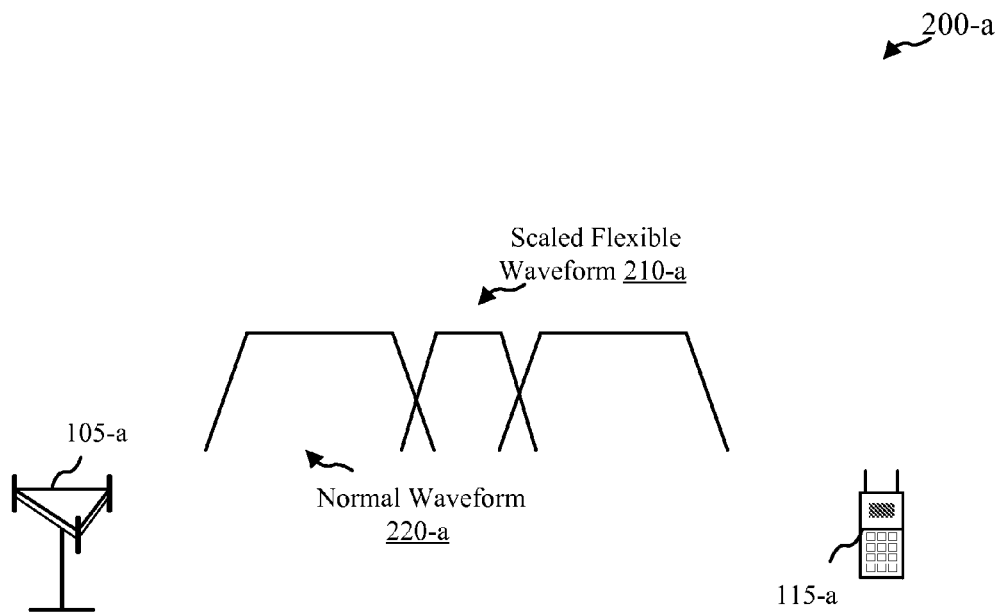
FIG. 2A shows an example of a wireless communications system where a flexible waveform fits into a portion of spectrum not broad enough to fit a normal waveform in accordance with various embodiments.
Figure 2B:
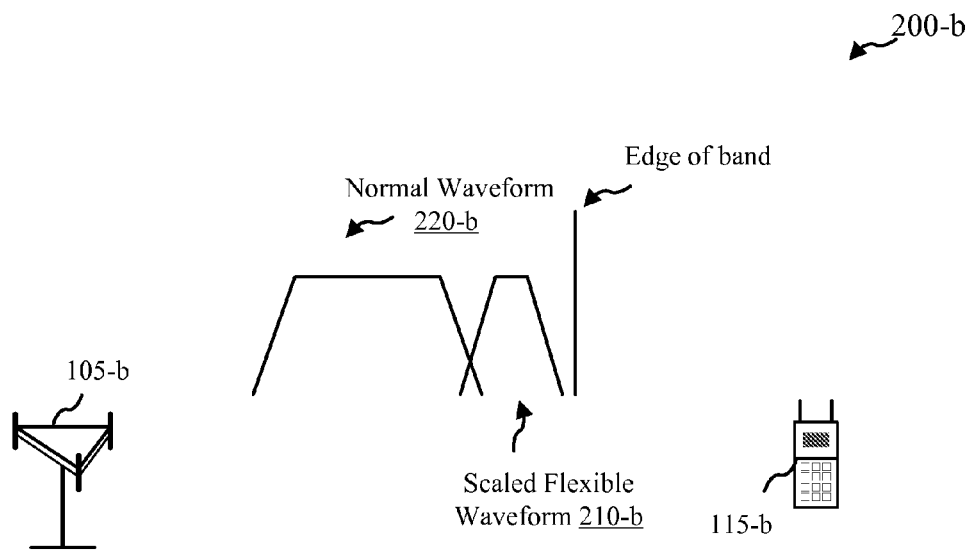
FIG. 2B shows an example of a wireless communications system where a flexible waveform fits into a portion of spectrum near an edge of a band in accordance with various embodiments.

FIG. 2A shows an example of a wireless communications system 200-a with a base station 105-a and a user equipment 115-a in accordance with various embodiments, where a flexible waveform 210-a fits into a portion of spectrum not broad enough to fit a normal waveform 220-a. System 200-a may be an example of system 100 of FIG. 1. In some embodiments, the flexible waveform 210-a may overlap with the normal waveform 220-a that either the base 105-a and/or the user equipment 115-a may transmit. Some embodiments may also utilize multiple flexible waveforms 210. In some embodiments, another base station and/or user equipment (not shown) may transmit the normal waveform 220-a and/or the flexible waveform 210-a. FIG. 2B shows an example of a wireless communications system 200-b with a base station 105-b and user equipment 115-b, where a flexible waveform 210-b fits into a portion of spectrum near an edge of a band, which may be a guard band, where normal waveform 220-b may not fit. System 200-b may be an example of system 100 of FIG. 1.

In some embodiments, the user equipment 115-a/115-b and/or the base station 105-a/150-b may be configured for signaling and/or receiving assistance information to one or more user equipment 115, referred herein as user equipment (UEs), to facilitate mobility management with respect to a flexible bandwidth carrier, which may be associated with one or more base stations 105. In some embodiments, a network and/or base station 105 may provide assistance information to UEs 115 by: provisioning, broadcast messages, and/or dedicated messages. Some embodiments may include signaling and/or broadcasting flexible bandwidth carrier or cell information to UEs 115 utilizing, but not limited, to the following approaches: UE-centric approaches, network-centric approaches, network-centric approaches with PLMN, new SIB creation approaches, and/or application layer approaches.

In some embodiments, base stations 105-a/105-b may be configured for determining assistance information regarding a first flexible bandwidth carrier for one or more user equipment 115-a/115-b to facilitate mobility management. The bandwidth scaling factor may be utilized to generate a first flexible bandwidth for the first flexible bandwidth carrier. A base station 105-a/105-b may be configured for transmitting the assistance information regarding the first flexible bandwidth carrier to the one or more user equipment 115-a/115-b to facilitate mobility management.

Some embodiments include configuring one or more user equipment 115 for mobility management within wireless communications system 100. For example, a user equipment 115-a/115-b may be configured for receiving assistance information regarding a first flexible bandwidth carrier to facilitate mobility management. A bandwidth scaling factor may be utilized to generate a first flexible bandwidth for the first flexible bandwidth carrier. A user equipment 115-a/115-b may be configured for utilizing the assistance information regarding the first flexible bandwidth carrier to facilitate mobility management.

In some embodiments, the assistance information to facilitate mobility management facilitates mobility between the first flexible bandwidth carrier and a second flexible bandwidth carrier, or other flexible bandwidth carriers for a user equipment 115-a/115-b. The first flexible bandwidth carrier and the second flexible bandwidth carrier may utilize the same bandwidth scaling factor. The first flexible bandwidth carrier and the second flexible bandwidth carrier may utilize different bandwidth scaling factors. The assistance information to facilitate mobility management may facilitate mobility between the flexible bandwidth carrier and a normal bandwidth carrier.

Figure 3:
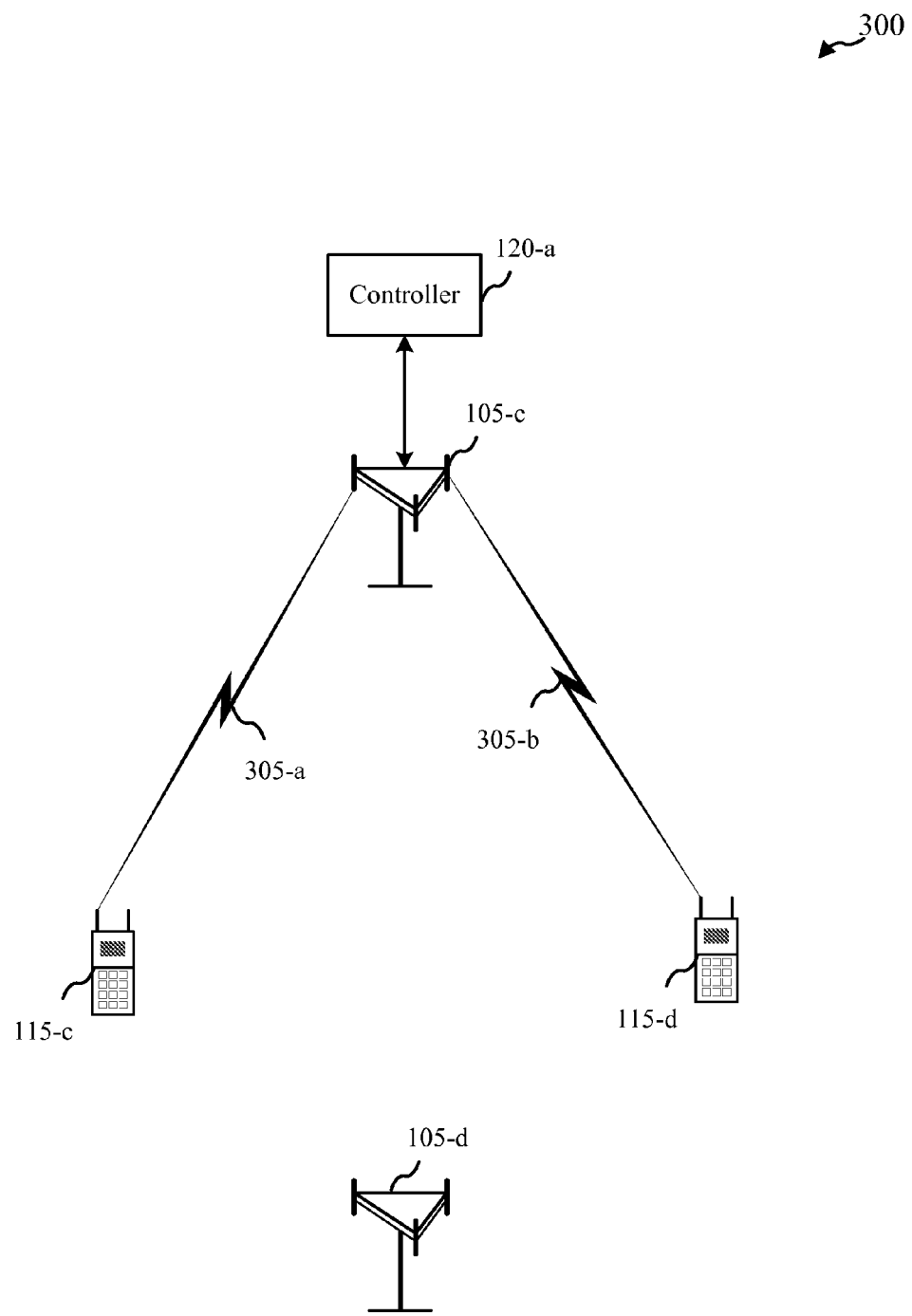
FIG. 3 shows a block diagram of a wireless communications system in accordance with various embodiments.

FIG. 3 shows a wireless communications system 300 with base stations 105-c and 105-d, controller 120-a, and user equipment 115-c and 115 d, in accordance with various embodiments. In some embodiments, the base station 105-c and/or the user equipment 115-c/115-d may be configured for signaling and/or receiving assistance information with respect to one or more user equipment 115 to facilitate mobility management with respect to one or more flexible bandwidth carriers, or base stations 105-d. In some embodiments, a controller 120-a and/or base station 105-c may provide assistance information to user equipment 115-c and/or 115-d by: provisioning, broadcast messages, and/or dedicated messages. Some embodiments may include signaling and/or broadcasting flexible bandwidth carrier or cell information to UEs 115-c and/or 115-d utilizing, but not limited, to the following approaches: UE-centric approaches, network-centric approaches, network-centric approaches with PLMN, new SIB creation approaches, and/or application layer approaches. The assistance information may be utilized by user equipment 115-c and 115 d to facility mobility with respect to base station 105-d, which may be configured to utilize a flexible bandwidth carrier.

Transmissions 305-a and/or 305-b between the user equipment 115-c and/or 115-d and the base station 105-c or base station 105-d (transmissions not shown) may utilize flexible waveforms that may be generated to occupy less (or more) bandwidth than a normal waveform. For example, at a band edge, including the edge of the operator's contiguous spectrum allocation, there may not be enough available spectrum to place a normal waveform. For a flexible waveform, as time gets dilated, the frequency occupied by a waveform goes down, thus making it possible to fit a flexible waveform into spectrum that may not be broad enough to fit a normal waveform. In some embodiments, the flexible waveform may be scaled utilizing a scaling factor N with respect to a normal waveform. Scaling factor N may be referred to as a bandwidth scaling factor. Scaling factor N may be utilized to scaling a bandwidth for a flexible bandwidth carrier. Scaling factor N may take on numerous different values including, but not limited to, integer values such as 1, 2, 3, 4, 8, etc. N, however, does not have to be an integer. In some cases, a chip rate divider (Dcr) may be utilized, which may have the same numerical value as a bandwidth scaling factor.

Some embodiments may utilize additional terminology. A new unit D may be utilized. The unit D is "dilated". The unit is unitless and has the value of N. One can talk about time in the flexible system in terms of "dilated time". For example, a slot of say 10 ms in normal time may be represented as 10 Dms in flexible time (note: even in normal time, this will hold true since N=1 in normal time: D has a value of 1, so 10 Dms=10 ms). In time scaling, one can replace most "seconds" with "dilated-seconds".

As discussed above, a flexible waveform may be a waveform that occupies less, or more, bandwidth than a normal waveform. Thus, in a flexible bandwidth carrier system, the same number of symbols and bits may be transmitted over a longer duration compared to a normal bandwidth system. This may result in time stretching, whereby slot duration, frame duration, etc., may increase by a scaling factor N. Scaling factor N may represent the ratio of the flexible bandwidth (BW) to a normal bandwidth. Thus, data rate in a flexible bandwidth system may equal Normal Rate×1/N, and delay may equal Normal Delay×N. In general, a flexible systems channel BW=channel BW of normal systems/N. Delay-Brandwidth product, Delay×BW, may remain unchanged. Furthermore, in some embodiments, a flexible waveform may be a waveform that occupies more bandwidth than a normal waveform.

Throughout this specification, the term normal system, subsystem, and/or waveform may be utilized to refer to systems, subsystems, and/or waveforms that involve embodiments that may utilize a scaling factor that may be equal to one (e.g., N=1) or a normal or standard chip rate. These normal systems, subsystems, and/or waveforms may also be referred to as standard and/or legacy systems, subsystems, and/or waveforms. Furthermore, flexible systems, subsystems, and/or waveforms may be utilized to refer to systems, subsystems, and/or waveforms that involve embodiments that may utilize a scaling factor that may be not equal to one (e.g., N=2, 3, 4, 8, ½, ¼, etc.). For N>1, or if a chip rate is decreased, the bandwidth of a waveform may decrease. Some embodiments may utilize scaling factors or chip rates that increase the bandwidth. For example, if N<1, or if the chip rate is increased, then a waveform may be expanded to cover bandwidth larger than a normal waveform. Flexible systems, subsystems, and/or waveforms may also be referred to as fractional systems, subsystems, and/or waveforms in some cases. Fractional systems, subsystems, and/or waveforms may or may not change bandwidth, for example. A fractional system, subsystem, or waveform may be flexible because it may offer more possibilities than a normal or standard system, subsystem, or waveform (e.g., N=1 system).

Figure 4:
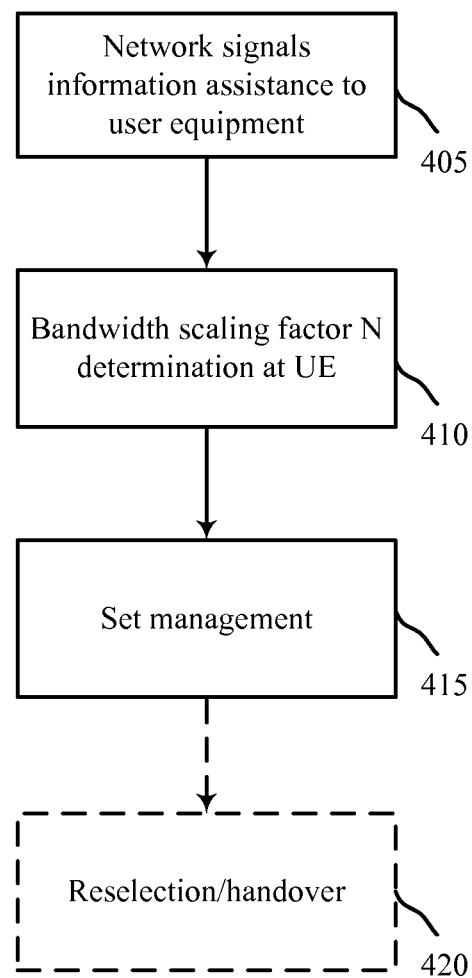
FIG. 4 shows a block diagram illustrating mobility management procedures in accordance with various embodiments.
Figure 9:
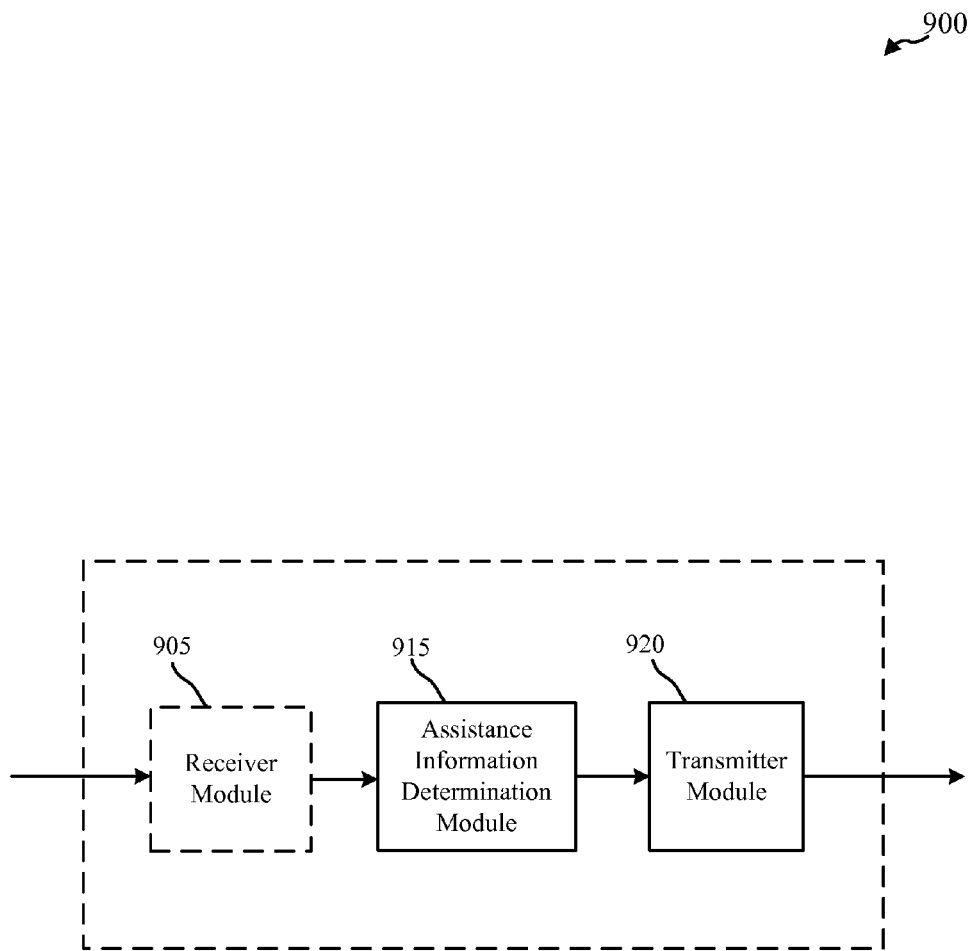
FIG. 9 shows a block diagram of a device configured for mobility management in accordance with various embodiments.

Turning now to FIG. 4, a block diagram 400 illustrates mobility management procedures in accordance with various embodiments. Aspects of block diagram may be implemented in whole or in part utilizing various wireless communications devices including, but not limited to: a base station 105 as seen in FIG. 1, FIG. 2, FIG. 3, FIG. 10, and/or FIG. 13; a device 900 as seen in FIG. 9; a core network 130 as seen in FIG. 1 and or FIG. 10, controller 120 as seen in FIG. 1, FIG. 3, and/or FIG. 10; a user equipment 115 as seen in FIG. 1, FIG. 2, FIG. 3, FIG. 10, FIG. 12, and/or FIG. 13; and/or a device 1100 as seen in FIG. 11. At block 405, a network may signal assistance information to UE to assist UE in mobility management. The network may signal assistance information about neighboring cells to the UEs, for example. At block 410, one or more scaling factors N may be determined at a UE. This may be part of a search procedure. For example, the UE may search for cells or carriers autonomously and/or with the help of the network by using the signaled assistance information. The cells may be flexible bandwidth cells; the carriers may be flexible bandwidth carriers. In some cases, the scaling factors associated with different flexible bandwidth cells or carriers may be signaled to the UE from the network, through a base station, for example. In cases where the value of N is not signaled to the UE, the UE may determine the one or more scaling factors associated with one or more cells by trying multiple bandwidth scaling factor hypotheses, for example. For example, many N hypotheses could be tried. At block 415, set management procedures may be performed. For example, a UE may develop various mobility cell sets to be used for further handovers and reselections as shown in block 420. Handovers may occur when the UE is moved from one cell to another while in connected mode, actively communicating to the network while the reselection may occur when the UE moves from one cell to another while in idle mode, not actively communicating with the network.

Embodiments may include a variety of mobility management scenarios. A flexible bandwidth UE, for example, may use the mobility procedures to migrate according to different mobility scenarios. A flexible bandwidth UE may move from a flexible bandwidth carrier or cell with frequency scaling factor or bandwidth scaling factor N=x to another flexible bandwidth carrier or cell with the same N. These cells may be deployed on the same carrier frequency but separated by different PSCs, for example. The two cells could also be deployed on different carrier frequencies in some embodiments. A flexible bandwidth UE may move from a flexible bandwidth carrier or cell with N=x to another flexible bandwidth carrier or cell with a different N, N=y. Both cells may be deployed on different carrier frequencies. A flexible bandwidth UE may move from a flexible bandwidth carrier or cell with N=x to a non-flexible or legacy cell, such as WCDMA and/or GSM cells, for example. Likewise, the UE may move from a non-flexible bandwidth carrier or cell, or legacy cell, such as WCDMA and/or GSM to a flexible bandwidth carrier or cell. Both cells may be deployed on different carrier frequencies. In some cases, the non-flexible bandwidth carrier or cell, or legacy cell, such as WCDMA and/or GSM cells, and flexible bandwidth carrier or cells may be co-located at the same site or deployed in different sites. In some embodiments, once a UE moves to a flexible bandwidth carrier or cell, it may perform mobility procedures (e.g., send registration message, location area updates, routing area updates, etc.) as currently performed in non-flexible networks, or legacy networks, such as WCDMA networks, for example. While some of the above examples include WCDMA and/or GSM cells, other embodiments may utilize other radio access technologies (RATs).

FIG. 5 shows a table 500 that includes several different mobility scenarios, though some embodiments may utilize other scenarios. Handover/Reselection scenarios 510 show several different cases of possible UE moves from one carrier to another, where the carriers may be flexible bandwidth carriers and/or normal (or legacy) bandwidth carriers. Deployment scenarios 520 for each case reflect whether the deployment scenarios may be intra-frequency, inter-frequency, and/or inter-RAT. Aspects of table 500 may be implemented in whole or in part utilizing various wireless communications devices including, but not limited to: a base station 105 as seen in FIG. 1, FIG. 2, FIG. 3, FIG. 10, and/or FIG. 13; a device 900 as seen in FIG. 9; a core network 130 as seen in FIG. 1 and/or FIG. 10; a controller 120 as seen in FIG. 1, FIG. 3, and/or FIG. 10: a user equipment 115 as seen in FIG. 1, FIG. 2, FIG. 3, FIG. 10, FIG. 12, and/or FIG. 13; and/or a device 1100 as seen in FIG. 11.

Some embodiments include signaling information to assistance a flexible bandwidth UE. A network, through a base station for example, may signal or transmit a variety of information to one or more UEs about a flexible bandwidth cell while the UEs may be camped on or connected to another flexible bandwidth cell or a normal cell, the serving cell. Information that may be sent to flexible bandwidth UE may include, but is not limited to: PLMN ID (if different from the PLMN of the serving cell, for example), carrier frequency (e.g., Band and UARFCN), Primary Scrambling Code (PSC), flexible bandwidth scaling factor (N), cell timing (e.g., System Frame N number, cell timing), cell specific S-parameters for idle mode operations (optional, e.g., carrier offsets), and/or cell specific handover parameters for connected mode operations (optional, e.g. cell specific offsets). In some cases, this information may already be provided to UEs in existing networks except for the flexible bandwidth scaling factor (N). In some embodiments, a network may provide information to UEs by: provisioning where UE may receive pre-configuration information from the operator (e.g., PLMN ID)), broadcast messages (e.g., System Information Block (SIBs)) where UE may receive information on cell-wide broadcasted SIBs while in Idle mode, and/or dedicated messages where UE may receive information through dedicated messages from the network while in connected mode. UEs can also receive SIBs in connected mode. In some embodiments, the network may provide information to the UE in other ways.

Sending UE assistance information via provisioning or dedicated messages may be easily done without impacting non-flexible bandwidth UEs in the network. However, the network may be faced with the challenge of minimizing the impact to non-flexible bandwidth (e.g., legacy) UEs when information is broadcasted to all UEs through a legacy network like GSM or WCDMA. Some embodiments may provide means for addressing this issue and/or other issues. Embodiments may include signaling and/or broadcasting flexible bandwidth carrier or cell information to UEs utilizing, but not limited, to the following approaches: UE-centric approaches, network-centric approaches, network-centric approaches with PLMN, new SIB creation approaches, and/or application layer approaches (e.g., generic server approaches (using SMS or data message, for example) and/or OMA—Device Management server approaches). These different approaches may be utilized with a variety of different radio access technologies. For example, these approaches may be used on GSM and/or WCDMA networks. The first four approaches 1-4 are described herein assuming WCDMA but the same mechanism can be applied to GSM EDGE Radio Access Networks (GERAN) and other networks and/or RATs. Some of these approaches may be referred to as neighbor list approaches.

Some embodiments utilize a UE-centric approach with regard to signaling assistance information to a flexible bandwidth UE. For example, flexible bandwidth carrier or cell information such as carrier frequency and PSC in the Cell INFO LIST may be included on SIB 11 and/or 12. In UMTS, for example, UEs may read SIB 12 in some connected UE states (e.g., CELL_FACH) and SIB 11 in idle mode. In the absence of SIB 11 in connected mode, the UE may use the information previously received on SIB 12. To avoid modification to the existing SIBs, the N value may not be broadcast. In some cases, if SIB 11 is too large, SIB 11bis may be used. Legacy UEs may search for the flexible bandwidth carrier or cell using N=1 but the search may be unsuccessful. Flexible bandwidth UEs may first search for cell using N=1 hypothesis and if the cell is not found search for other possible Ns for flexible bandwidth systems. This approach may require no changes to existing network or pre-configuration from the network. In GSM, for idle mode UEs, this approach may be equivalent to adding flexible bandwidth carrier or cell's frequency and BSIC information to SIB2/2bis/2iter and 2quater, respectively. For connected mode UEs, the frequency and BSIC may be added to SIB5/SIB5bis/5iter and measurement information message, respectively.

Some embodiments utilize a network-centric approach with regard to signaling assistance information to a flexible bandwidth UE. Some embodiments include a new information element (IE) in current SIB 11/SIB 11 bis/SIB 12 that are targeted towards flexible bandwidth UEs only (i.e., flexible bandwidth UEs may read those fields but non-flexible bandwidth UEs may ignore the new IE). The IE may contain frequency, PSC, and/or flexible scaling factor for the signaled flexible bandwidth carrier or cell. Since the flexible scaling factor may be signaled, no blind decodes may be necessary. However, changes may be required to existing networks (e.g. the UTRAN) to deploy this solution, so infra vendor agreement may be required for deployment. In GSM, for idle mode UEs, it may be possible to include flexible bandwidth carrier or cell's frequency information in the SIB2/2bis/iter and the BSIC and flexible bandwidth scaling factor in the SIB2quater. For connected mode, the BSIC and the flexible bandwidth scaling factor may be included in the measurement information dedicated message.

Some embodiments utilize a network-centric PLMN approach with regard to signaling assistance information to a flexible bandwidth UE. An operator may assign a separate PLMN for flexible bandwidth carrier or cells, therefore, a flexible bandwidth UE may be provisioned with a new PLMN ID for flexible bandwidth cells in addition to the PLMN ID used for normal bandwidth cells. Flexible bandwidth and non-flexible bandwidth cells' carrier frequencies and PSCs may then be broadcasted on SIB 11 and SIB 11 bis, for example. To avoid changes to the standards, the value of N may not be broadcasted so the UE may perform blind decodes. In order to determine which cells are flexible bandwidth cells, the UE may read SIB 18. For example, the PLMN IDs and cells associated with each PLMN ID may be indicated in SIB 18. UEs may decode and read SIB 18 and based on the PLMN ID that is indicated on SIB 18 and the associated cells, they may determine which cells from SIB 11/SIB 11bis may be added to their neighbor lists. For example, since the legacy UEs may not be provisioned with the PLMN ID for flexible bandwidth cells, those cells would be ignored (not added to the neighbor list) when the legacy UEs read the SIB 11/11bis. On the other hand, the flexible UEs would be able to identify flexible bandwidth cells from SIB 18 although; the flexible bandwidth scaling factor might have to be determined by UE. Change in standard may allow for bandwidth scaling factors and/or other information to be communicated in some cases.

Some embodiments utilize creating a new SIB approach with regard to signaling assistance information to a flexible bandwidth UE. For example, the new SIB may contain information about flexible bandwidth cells e.g. frequency, PSC, etc. For more flexibility, new SIBs may be created to carry flexible bandwidth specific information. Legacy UEs may be unaware of the new SIB and therefore they may not decode it. Changes may be required to existing networks (e.g. the UTRAN) so infra vendor agreements may be required.

Some embodiments utilize an application layer approach with regard to signaling assistance information to a flexible bandwidth UE. For example, assuming no changes to the GSM/WCDMA standard, it may be possible to convey information to the flexible bandwidth UEs using an application layer approach. The application approach may include using: SMS and/or data message to convey flexible bandwidth system information to UEs using a generic server, and/or Open Mobile Alliance (OMA)-Device Management (DM) server. These servers may be used by operators to push an application to flexible bandwidth UEs to let flexible bandwidth UE know about flexible bandwidth System Information when flexible bandwidth coverage may be available in a given geographic region. To ensure that non-flexible bandwidth UEs in the network may not be sent flexible bandwidth carrier or cell information, the network may need to obtain UE capabilities (e.g. by requesting the UE's IMEI). The operators may use the IMEI to access a database of UE capabilities and confirm UE flexible bandwidth capabilities. Once the UE is confirmed to be a flexible bandwidth UE, the application server may send flexible bandwidth assistance information to the UE. The UE may either be in idle or connected mode as shown in the following FIGS. 6A, 6B, and/or 6C. Since SMS messages may have a limited payload, multiple messages might have to be sent to the UE. Also, SMS messages may incur significant latency problems.

Figure 6A:
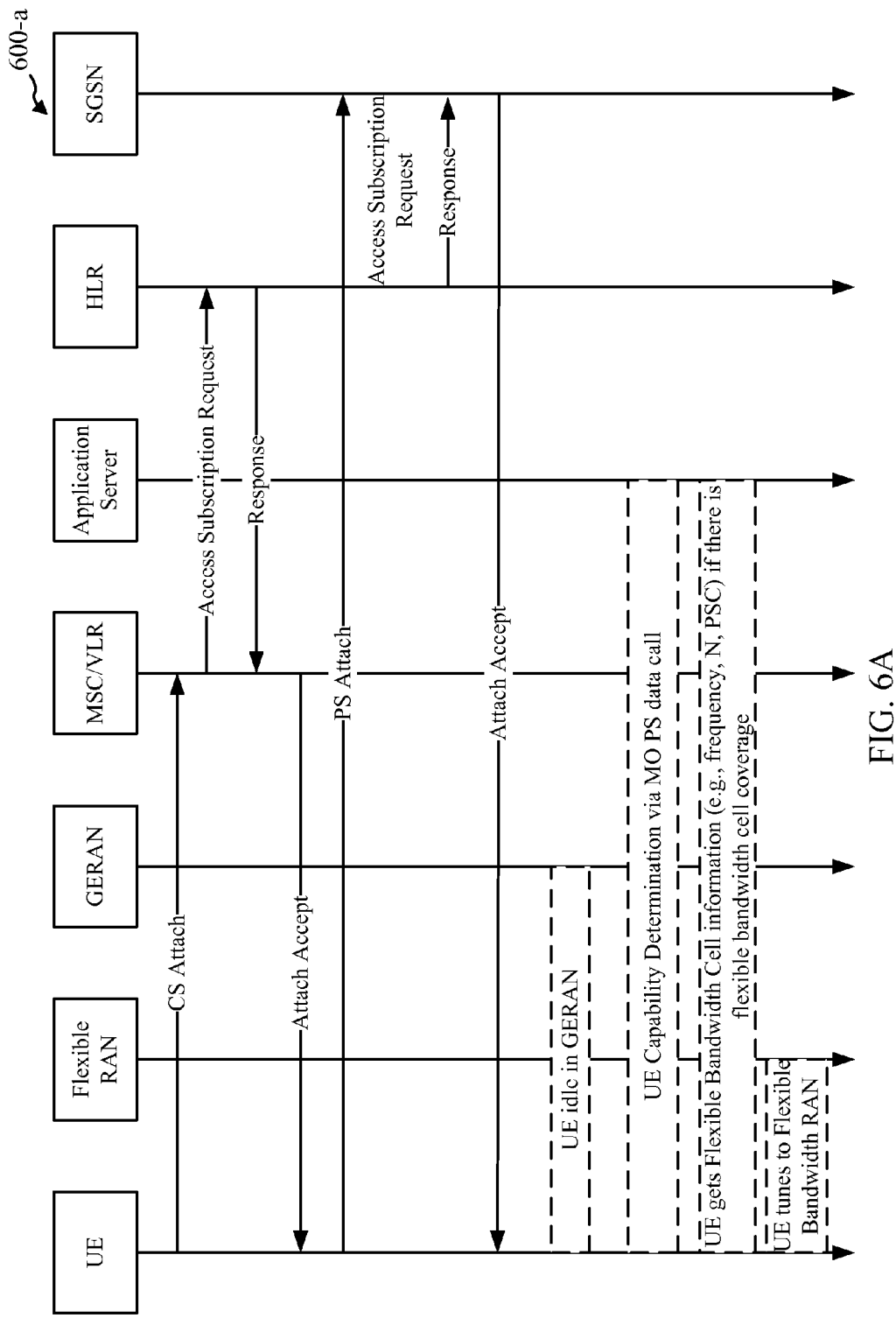
FIGS. 6A, 6B, and 6C shows communications diagrams in accordance with various embodiments.
Figure 6B:
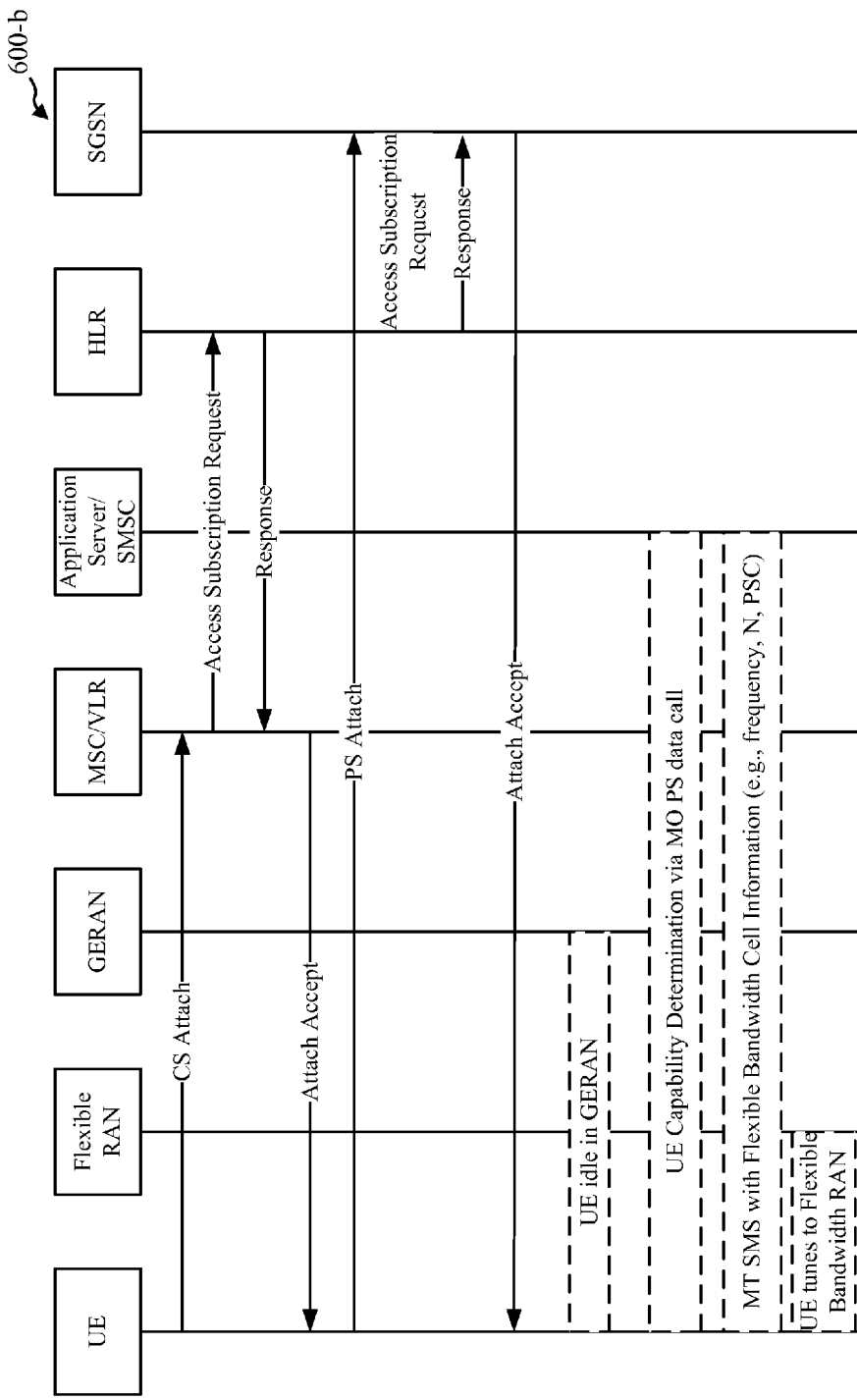
Figure 6C:
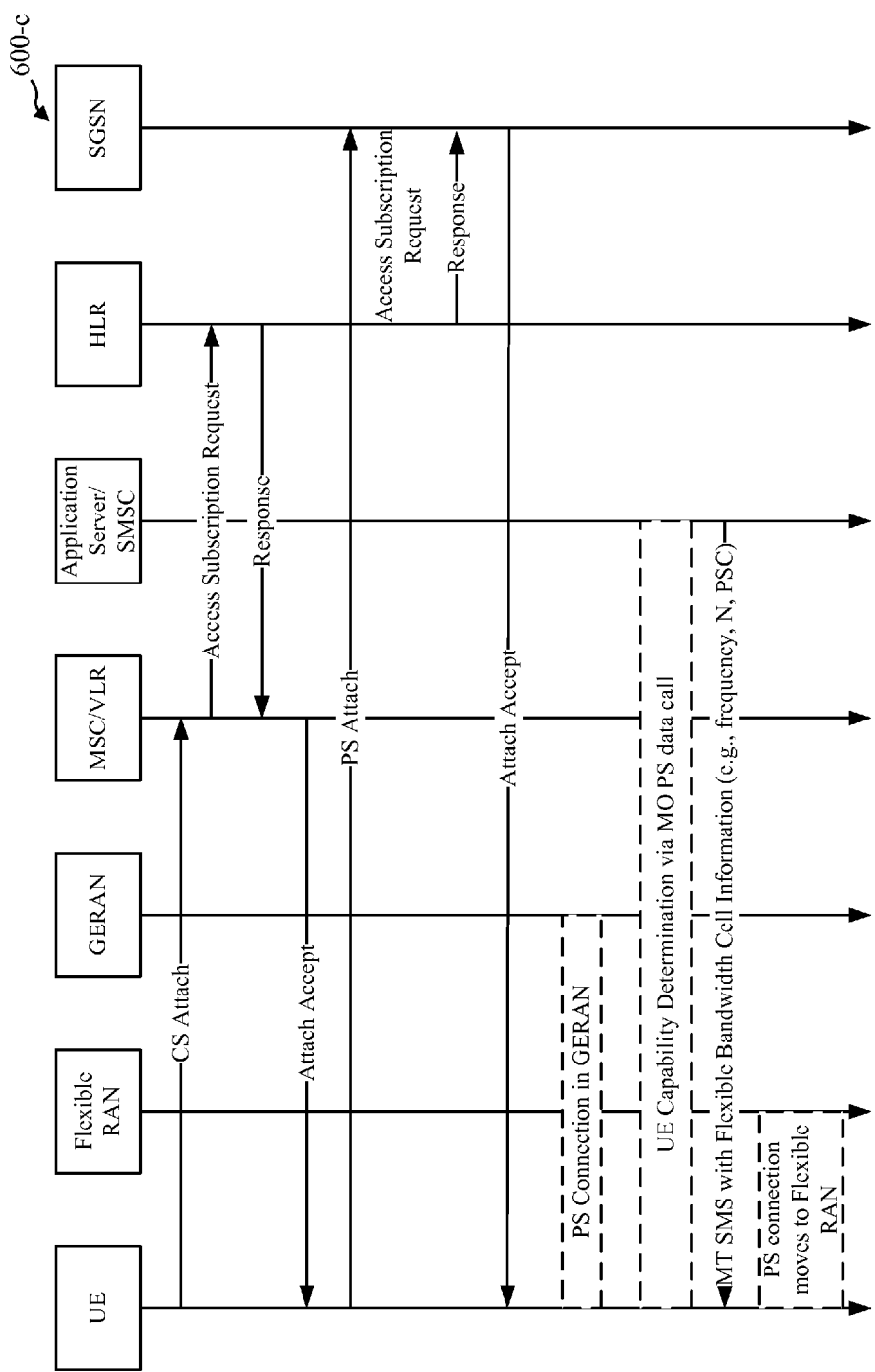

FIG. 6A shows a communications diagram 600-*a* in accordance with various embodiments. Communications diagram 600-*a* may include a data message-based assistance information approach for an idle mode UE on the GERAN utilizing a generic server. The assistance information is provided to the UE by the application server setting up a packet switched (PS) data call between the UE and the server. FIG. 6B, for example, shows a communications diagram 600-*b* in accordance with various embodiments. Communications diagram 600-*b* may include an SMS-based assistance information approach for a UE initially in idle mode on the GERAN. Assistance information is provided by a generic application server. The application server may trigger the MT SMS (through the SMS center (SMSC)) to the flexible bandwidth UEs. The SMS may carry the assistance information (such as the frequency, PSC, etc.) to the flexible bandwidth UE. As shown in FIG. 6B, the application server (generic server) may be collocated with the SMSC or can be a separate box. FIG. 6C, for example, shows a communications diagram 600-*c* in accordance with various embodiments. Communications diagram 600-c may include an SMS-based assistance information approach (utilizing a generic server) for a UE in PS call). The application server may be collocated with SMSC or can be a separate box. The application server may trigger the MT SMS carrying assistance information to the flexible bandwidth UEs. Aspects of communications diagrams 600-a, 600-b, and/or 600-c may be implemented in whole or in part utilizing various wireless communications devices including, but not limited to: a base station 105 as seen in FIG. 1, FIG. 2, FIG. 3, FIG. 10, and/or FIG. 13; a device 900 as seen in FIG. 9; a core network 130 as seen in FIG. 1 and/or FIG. 10; a controller 120 as seen in FIG. 1, FIG. 3, and/or FIG. 10: a user equipment 115 as seen in FIG. 1, FIG. 2, FIG. 3, FIG. 10, FIG. 12, and/or FIG. 13; and/or a device 1100 as seen in FIG. 11.

Figure 7:
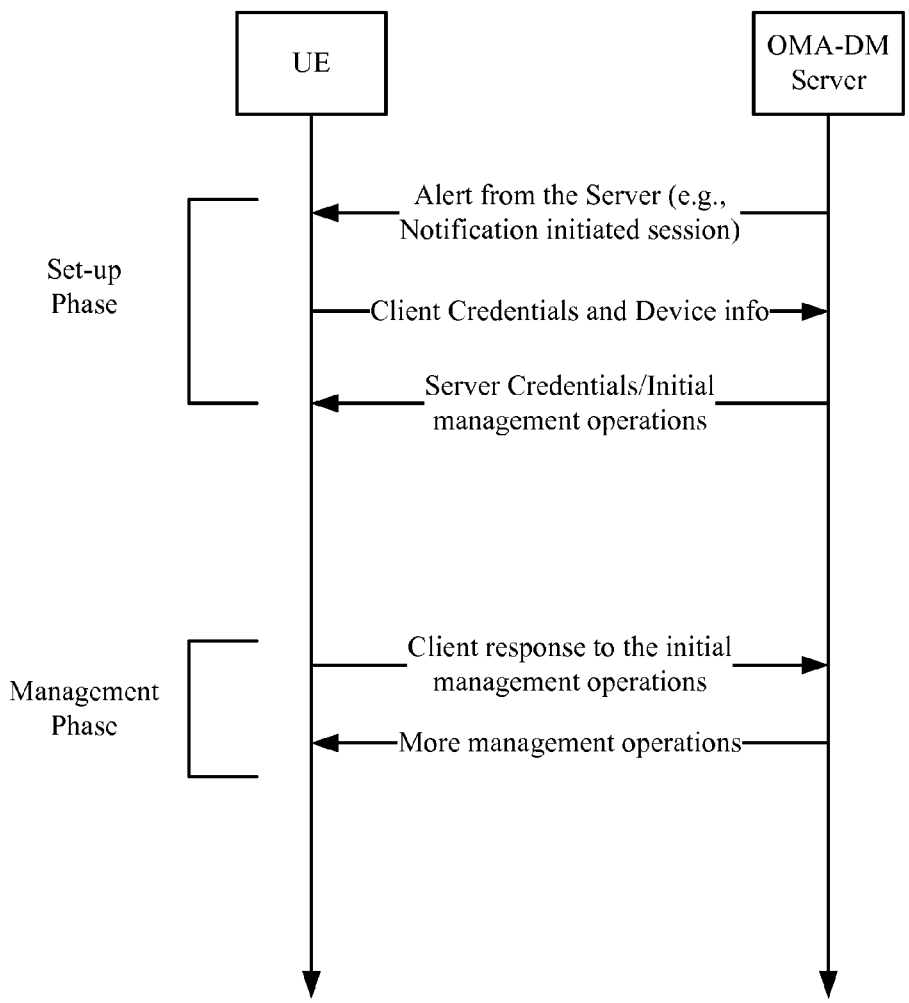
FIG. 7 shows a communications diagram in accordance with various embodiments.

Turning now to FIG. 7, a communications diagram 700 for assistance information with OMA-Device Management is provided in accordance with various embodiments. OMA-Device management (DM) may provide a mechanism for performing, provisioning, remote maintenance, and reporting of configuration data to a device, software, and firmware installation updates. The OMA-DM servers may use Wireless Access Protocol (WAP) over SMS or HTTPs DM session over SSL to send messages to mobiles, for example. For flexible bandwidth systems and/or devices, embodiments can use APIs on the OMA-DM servers to: first obtain information about the UEs capabilities (e.g., OMA-DM server may request the UE's device info (e.g., IMEI, device model, etc.)), and/or a customized message containing flexible bandwidth carrier or cell information may then be delivered to the UE. Device information may include, but is not limited to, manufacturer's information, device model, and/or a unique identifier of the device. Once the UE is determined to be flexible bandwidth capable, then the assistance information can be communicated to flexible bandwidth UE using the "management operations" messages. Aspects of communications diagram 700 may be implemented in whole or in part utilizing various wireless communications devices including, but not limited to: a base station 105 as seen in FIG. 1, FIG. 2, FIG. 3, FIG. 10, and/or FIG. 13; a device 900 as seen in FIG. 9; a core network 130 as seen in FIG. 1 and/or FIG. 10; a controller 120 as seen in FIG. 1, FIG. 3, and/or FIG. 10: a user equipment 115 as seen in FIG. 1, FIG. 2, FIG. 3, FIG. 10, FIG. 12, and/or FIG. 13; and/or a device 1100 as seen in FIG. 11.

Network assistance information may have different impacts on network architecture. A flexible bandwidth carrier or cell, for example, may utilize similar RAN network as the UMTS RAN. The UTRAN might be shared with WCDMA networks or deployed separately, for example. Some of the network assistance information approaches (e.g., network-centric approach, new SIB creation, etc.) may require changes to the network, such as UTRAN.

Figure 8:
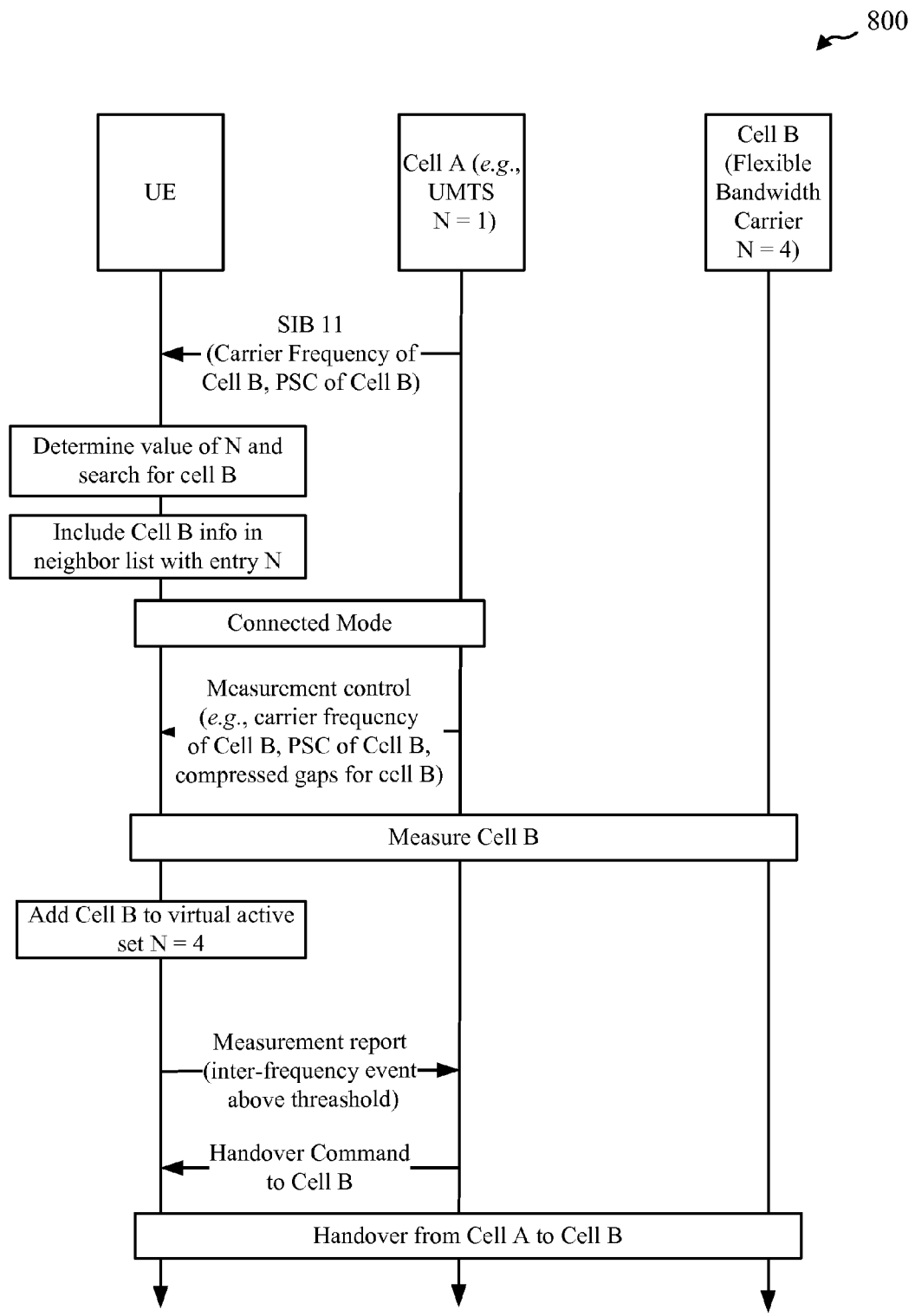
FIG. 8 shows a flow diagram in accordance with various embodiments.

FIG. 8 shows a communications diagram 800 that shows an example of a flexible bandwidth UE migrating from cell A, a WCDMA/UMTS cell with N=1 to cell B, a flexible bandwidth carrier or cell, with N=4. While in idle mode on cell A, the flexible bandwidth UE may receive information about the flexible bandwidth carrier or cell from the broadcasted SIB 11 message (UE centric approach is assumed). UE may determine the appropriate N for cell B by using different N hypotheses to search for the cell. Once the correct N for cell B is identified, the UE may add cell B and its associated N to list of neighboring cells. This UE may at some point transition into the connected mode on cell A. In connected mode, due to degradation in signal strength, the network may provide compressed gaps to the UE to measure the flexible bandwidth carrier or cell B. Since the cell may have already been identified in idle mode, the timing may be known so the acquisition delay may be minimized. Due to strong signal strength measurements on cell B (signal strength above a given threshold), the UE may add cell B to virtual active set and also sends a measurement report to the network. The network may order an inter-frequency handover to flexible bandwidth carrier or cell B. The UE may tune to flexible bandwidth carrier or cell B and may send update the network with its location (e.g., sending a routing area update as currently performed in WCDMA networks). Aspects of communications diagram 800 may be implemented in whole or in part utilizing various wireless communications devices including, but not limited to: a base station 105 as seen in FIG. 1, FIG. 2, FIG. 3, FIG. 10, and/or FIG. 13; a device 900 as seen in FIG. 9; a core network 130 as seen in FIG. 1 and/or FIG. 10; a controller 120 as seen in FIG. 1, FIG. 3, and/or FIG. 10, a user equipment 115 as seen in FIG. 1, FIG. 2, FIG. 3, FIG. 10, FIG. 12, and/or FIG. 13; and/or a device 1100 as seen in FIG. 11.

Some embodiments may provide assistance information for CDMA1×/1×EVDO. For example, an application layer approach to convey flexible bandwidth system information (flexible 1×/EV-DO) may be essentially similar to the approaches discussed in the context of flexible bandwidth UMTS. UE-centric (or mobile station (MS)/access terminal (AT)-centric) approaches may include flexible bandwidth carrier or cell information such as carrier frequency and PN offset in SectorParameters Message. To avoid modification to the existing message, the N value may not be included. Legacy ATs may need to search for the flexible bandwidth carrier or cell using N=1 but search would be unsuccessful. Flexible bandwidth ATs may first search for cell using N=1 and if the cell is not found search for other possible Ns for flexible bandwidth following the N determination approaches discussed above. Network-centric approach may be utilized include a new flexible SectorParameters message that may be targeted towards flexible bandwidth ATs. (i.e., flexible bandwidth ATs may read the flexible bandwidth SectorParameters message but legacy ATs may ignore the new message).

Some embodiments may include flexible bandwidth neighbor structures. Flexible bandwidth neighbor structures may include the following fields: PilotPN, Channel, N (new addition for flexible bandwidth neighbor structure), SearchWindowSize, and/or SearchWindowOffset. A NeighborList message may be used to convey information corresponding to the neighboring sectors to the access terminals when AT is in the Connected State. This may assume that message is changed to include N. If this is not done, a UE-centric approaches (blind decode, BW measurement etc.) may have to be followed. Some embodiments may also include a preferred roaming list (PRL) for flexible bandwidth 1×/DO systems, which may include information such as: Acquisition Type (HDR Generic etc.), Band (PCS etc.), Channel, and/or scaling factor N (which may be added).

Turning next to FIG. 9, a block diagram illustrates a device 900 for mobility management in accordance with various embodiments. The device 900 may be an example of one or more aspects of: controllers 120 described with reference to FIG. 1, FIG. 3, and/or FIG. 10; and/or base stations 105 described with reference to FIG. 1, FIG. 2, FIG. 3, FIG. 10, and/or FIG. 13. The device 900 may also be a processor. The device 900 may include a receiver module 905, an assistance information determination module 915, and/or a transmitter module 920. In some embodiments, one or more of the receiver module 905, the assistance information determination module 915, and/or the transmitter module 920 may be integrated into separate controllers 120 and/or base stations 105; in some embodiments, a controller 120 may be integrated with a base station 105. Each of these components may be in communication with each other.

These components of the device 900 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 905 may receive information such as packet, data, and/or signaling information regarding what device 900 has received or transmitted. The received information may be utilized by the assistance information determination module 915 for a variety of purposes. For example, assistance information determination module 915 may be configured for determining assistance information regarding a first flexible bandwidth carrier for one or more user equipment (UEs) to facilitate mobility management. The bandwidth scaling factor may be utilized to generate a first flexible bandwidth for the first flexible bandwidth carrier. The transmitter module 920 may be configured for transmitting the assistance information regarding the first flexible bandwidth carrier to the one or more UEs to facilitate mobility management.

In some embodiments, the assistance information determination module 915 configured for determining and/or transmitting the assistance information regarding the first flexible bandwidth carrier to facilitate mobility management may be configured for determining the bandwidth scaling factor associated with the first flexible bandwidth carrier to facilitate mobility management. Determining and/or transmitting the assistance information regarding the first flexible bandwidth carrier to facilitate mobility management may include determining and/or transmitting assistance information consistent with a UE-centric approach, which may include at least one or more identifiers of the first flexible bandwidth carrier, wherein the one or more identifiers include at least a carrier frequency or a PSC of the first flexible bandwidth carrier while others like the bandwidth scaling factor may be determined at the UE. Determining and/or transmitting the assistance information regarding the first flexible bandwidth carrier to facilitate mobility management may include determining and/or transmitting assistance information consistent with a network-centric approach including at least one or more bandwidth scaling factors associated with the first flexible bandwidth carrier. Determining and/or transmitting the assistance information regarding the first flexible bandwidth carrier to facilitate mobility management may include determining and/or transmitting assistance information consistent with a network-centric PLMN approach where the received information includes one or more PLMN IDs to identify the first flexible bandwidth carrier. Determining and/or transmitting the assistance information regarding the first flexible bandwidth carrier to facilitate mobility management may include determining and/or transmitting one or more SIBs, which may convey the assistance information, such as including first flexible bandwidth specific information regarding the first flexible bandwidth carrier. Determining and/or transmitting the assistance information regarding the first flexible bandwidth carrier to facilitate mobility management may include determining and/or transmitting application layer based information including at least SMS, data messages, or OMA Device Management message with assistance information associated with first flexible bandwidth carrier.

In some embodiments, the assistance information to facilitate mobility management facilitates mobility between the first flexible bandwidth carrier and a second flexible bandwidth carrier. The first flexible bandwidth carrier and the second flexible bandwidth carrier may utilize the same bandwidth scaling factor. The first flexible bandwidth carrier and the second flexible bandwidth carrier may utilize different bandwidth scaling factors. The assistance information to facilitate mobility management may facilitate mobility between the flexible bandwidth carrier and a normal bandwidth carrier.

The assistance information determination module 915 may be configured for determining assistance information regarding a second flexible bandwidth carrier, or even other flexible bandwidth carriers, for one or more user equipment to facilitate mobility management. The second bandwidth scaling factors may be utilized to generate a flexible bandwidth for the second flexible bandwidth carrier. The transmitter module 920 may be configured for transmitting the assistance information regarding the second flexible bandwidth carrier to the one or more UEs to facilitate mobility management.

In some embodiments, the transmitter module 920 may be configured for transmitting the assistance information regarding the first flexible bandwidth carrier to the one or more UEs to facilitate mobility management where transmitting the assistance information occurs over a first bandwidth carrier different from the first flexible bandwidth carrier. Transmitting the assistance information over the first bandwidth carrier different from the first flexible bandwidth carrier may include transmitting the assistance information over a normal bandwidth carrier. Transmitting the assistance information over the first bandwidth carrier different from the first flexible bandwidth carrier may include transmitting the assistance information over a second flexible bandwidth carrier. In some embodiments, the first flexible bandwidth carrier is associated with a first flexible bandwidth cell.

Figure 10:
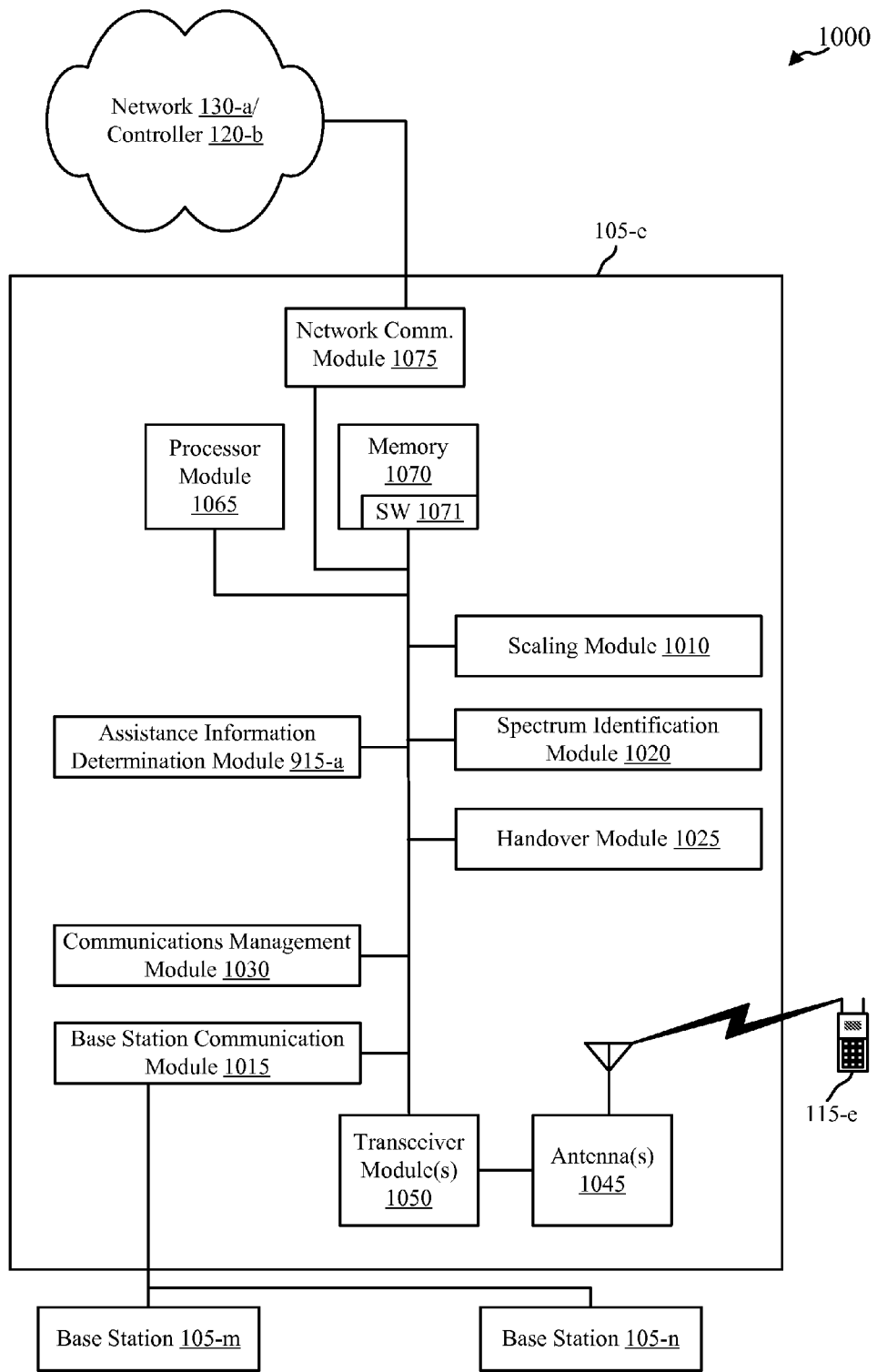
FIG. 10 shows a block diagram of a wireless communications system in accordance with various embodiments.
Figure 11:
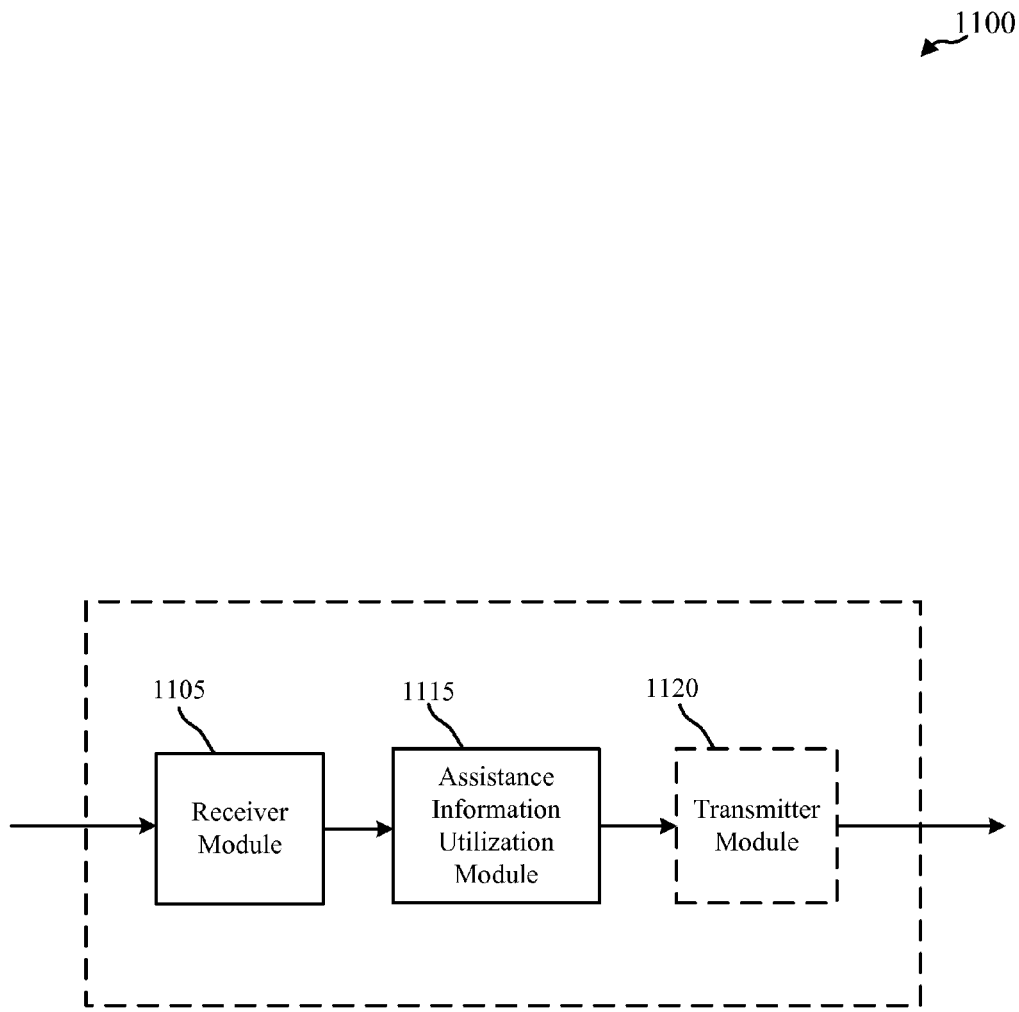
FIG. 11 shows a block diagram of a device configured mobility management in accordance with various embodiments.

FIG. 10 shows a block diagram of a communications system 1000 that may be configured for mobility management in accordance with various embodiments. This system 1000 may be an example of aspects of the system 100 depicted in FIG. 1, systems 200 of FIG. 2, system 300 of FIG. 3, and/or system 1300 of FIG. 13. The base station 105-*e* may include antennas 1045, a transceiver module 1050, memory 1070, and a processor module 1065, which each may be in communication, directly or indirectly, with each other (e.g., over one or more buses). The transceiver module 1050 may be configured to communicate bi-directionally, via the antennas 1045, with the user equipment 115-*e*, which may be a multi-mode user equipment. The transceiver module 1050 (and/or other components of the base station 105-*e*) may also be configured to communicate bi-directionally with one or more networks. In some cases, the base station 105-*e* may communicate with the network 130-*a* and/or controller 120-*a* through network communications module 1075. Base station 105-*e* may be an example of an eNodeB base station, a Home eNodeB base station, a NodeB base station, and/or a Home NodeB base station.

Controller 120-*b* may be integrated into base station 105-*e* in some cases, such as with an eNodeB base station.

Base station 105-*e* may also communicate with other base stations 105, such as base station 105-*m* and base station 105-*n*. Each of the base stations 105 may communicate with user equipment 115-*e* using different wireless communications technologies, such as different Radio Access Technologies. In some cases, base station 105-*e* may communicate with other base stations such as 105-*m* and/or 105-*n* utilizing base station communication module 1015. In some embodiments, base station communication module 1015 may provide an X2 interface within an LTE wireless communication technology to provide communication between some of the base stations 105. In some embodiments, base station 105-*e* may communicate with other base stations through controller 120-*b* and/or network 130-*a*.

The memory 1070 may include random access memory (RAM) and read-only memory (ROM). The memory 1070 may also store computer-readable, computer-executable software code 1071 containing instructions that are configured to, when executed, cause the processor module 1065 to perform various functions described herein (e.g., call processing, database management, message routing, etc.). Alternatively, the software 1071 may not be directly executable by the processor module 1065 but be configured to cause the computer, e.g., when compiled and executed, to perform functions described herein.

The processor module 1065 may include an intelligent hardware device, e.g., a central processing unit (CPU) such as those made by Intel® Corporation or AMD®, a microcontroller, an application-specific integrated circuit (ASIC), etc. The processor module 1065 may include a speech encoder (not shown) configured to receive audio via a microphone, convert the audio into packets (e.g., 20 ms in length) representative of the received audio, provide the audio packets to the transceiver module 1050, and provide indications of whether a user is speaking. Alternatively, an encoder may only provide packets to the transceiver module 1050, with the provision or withholding/suppression of the packet itself providing the indication of whether a user is speaking.

The transceiver module 1050 may include a modem configured to modulate the packets and provide the modulated packets to the antennas 1045 for transmission, and to demodulate packets received from the antennas 1045. While some examples of the base station 105-*e* may include a single antenna 1045, the base station 105-*e* preferably includes multiple antennas 1045 for multiple links which may support carrier aggregation. For example, one or more links may be used to support macro communications with user equipment 115-*e*.

According to the architecture of FIG. 10, the base station 105-*e* may further include a communications management module 1030. The communications management module 1030 may manage communications with other base stations 105. By way of example, the communications management module 1030 may be a component of the base station 105-*e* in communication with some or all of the other components of the base station 105-*e* via a bus. Alternatively, functionality of the communications management module 1030 may be implemented as a component of the transceiver module 1050, as a computer program product, and/or as one or more controller elements of the processor module 1065.

The components for base station 105-*e* may be configured to implement aspects discussed above with respect to device 900 in FIG. 9 and may not be repeated here for the sake of brevity. For example, the assistance information determination module 915-*a* may be assistance information determination module 915 of FIG. 9. In some embodiments, the controller 120-*b* may be configured to implement aspects discussed above with respect to device 900 in FIG. 9 and may not be repeated here for the sake of brevity. Base station 105-*e* and controller 120-*b* may deployed as separate entities or as a combined entity.

The base station 105-*e* may also include a spectrum identification module 1020. The spectrum identification module 1020 may be utilized to identify spectrum available for flexible waveforms. In some embodiments, a handover module 1025 may be utilized to perform handover procedures of the user equipment 115-*e* from one base station 105 to another. For example, the handover module 1025 may perform a handover procedure of the user equipment 115-*e* from base station 105-*e* to another where normal waveforms are utilized between the user equipment 115-*e* and one of the base stations and flexible waveforms are utilized between the user equipment and another base station. A scaling module 1010 may be utilized to scale and/or alter chip rates to generate flexible waveforms. In some embodiments, the controller 120-*b* may be configured to implement aspects as described above with respect handover module 1025, and may not be repeated here for the sake of brevity. Base station 105-*e* and controller 120-*b* may deployed as separate entities or as a combined entity.

In some embodiments, the transceiver module 1050 in conjunction with antennas 1045, along with other possible components of base station 105-*e*, may transmit information regarding flexible waveforms and/or scaling factors from the base station 105-*e* to the user equipment 115-*e*, to other base stations 105-*m*/105-*n*, or core network 130-*a*. In some embodiments, the transceiver module 1050 in conjunction with antennas 1045, along with other possible components of base station 105-*e*, may transmit information to the user equipment 115-*e*, to other base stations 105-*m*/105-*n*, or core network 130-*a*, such as flexible waveforms and/or scaling factors, such that these devices or systems may utilize flexible waveforms.

Turning next to FIG. 11, a block diagram illustrates a device 1100 for mobility management in accordance with various embodiments. The device 1100 may be an example of one or more aspects of user equipment 115 described with reference to FIG. 1, FIG. 2, FIG. 3, FIG. 10, FIG. 12 and/or FIG. 13. The device 1100 may also be a processor. The device 1100 may include a receiver module 1105, an assistance information utilization module 1115, and/or a transmitter module 1120. Each of these components may be in communication with each other.

These components of the device 1100 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 1105 may receive information such as packet, data, and/or signaling information regarding what device 1100 has received or transmitted. The received information may be utilized by the assistance information utilization module 1115 for a variety of purposes. For example, the assistance information utilization module 1115 and/or receiver module 1105 may be configured for receiving assistance information regarding a first flexible bandwidth carrier to facilitate mobility management. The bandwidth scaling factor may be utilized to generate a first flexible bandwidth for the first flexible bandwidth carrier. The assistance information utilization module 1115 may be configured for utilizing the assistance information regarding the first flexible bandwidth carrier to facilitate mobility management.

In some embodiments, the assistance information utilization module 1115 configured for receiving the assistance information regarding the first flexible bandwidth carrier to facilitate mobility management may be configured for receiving the bandwidth scaling factor associated with the first flexible bandwidth carrier to facilitate mobility management. Receiving the assistance information regarding the first flexible bandwidth carrier to facilitate mobility management may include receiving assistance information consistent with a UE-centric approach, which may include at least one or more identifiers of the first flexible bandwidth carrier, wherein the one or more identifiers include at least a carrier frequency or a PSC of the first flexible bandwidth carrier while others like the bandwidth scaling factor is determined at the UE. Receiving the assistance information regarding the first flexible bandwidth carrier to facilitate mobility management may include receiving assistance information consistent with a network-centric approach including at least one or more bandwidth scaling factors associated with the first flexible bandwidth carrier. Receiving the assistance information regarding the first flexible bandwidth carrier to facilitate mobility management may include receiving assistance information consistent with a network-centric PLMN approach where the received information includes one or more PLMN IDs to identify the first flexible bandwidth carrier. Receiving the assistance information regarding the first flexible bandwidth carrier to facilitate mobility management may include receiving one or more SIBs, which may convey the assistance information such as including first flexible bandwidth specific information regarding the first flexible bandwidth carrier. Receiving the assistance information regarding the first flexible bandwidth carrier to facilitate mobility management may include receiving application layer based information including at least SMS, data messages, or OMA Device Management message with assistance information associated with first flexible bandwidth carrier.

In some embodiments, the assistance information to facilitate mobility management facilitates mobility between the first flexible bandwidth carrier and a second flexible bandwidth carrier, or other flexible bandwidth carriers. The first flexible bandwidth carrier and the second flexible bandwidth carrier may utilize the same bandwidth scaling factor. The first flexible bandwidth carrier and the second flexible bandwidth carrier may utilize different bandwidth scaling factors. The assistance information to facilitate mobility management may facilitate mobility between a flexible bandwidth carrier and a normal bandwidth carrier.

In some embodiments, the assistance information utilization module 1115 and/or the receiver module 1105 may be configured for receiving assistance information regarding a second flexible bandwidth carrier to facilitate mobility management. The second bandwidth scaling factors may be utilized to generate a flexible bandwidth for the second flexible bandwidth carrier. Some embodiments include utilizing the assistance information regarding the second flexible bandwidth carrier to facilitate mobility management by the assistance information utilization module 1115.

In some embodiments, the assistance information utilization module 1115 and/or the receiver module 1105 configured for receiving the assistance information regarding the first flexible bandwidth carrier to facilitate mobility management includes receiving the assistance information over a first bandwidth carrier different from the first flexible bandwidth carrier. Receiving the assistance information over the first bandwidth carrier different from the first flexible bandwidth carrier may include receiving the assistance information over a normal bandwidth carrier. Receiving the assistance information over the first bandwidth carrier different from the first flexible bandwidth carrier may include receiving the assistance information over a second flexible bandwidth carrier.

In some embodiments, the first flexible bandwidth carrier is associated with a first flexible bandwidth cell. In some embodiments, receiving the assistance information and utilizing the assistance information regarding occurs at a user equipment (UE).

Figure 12:
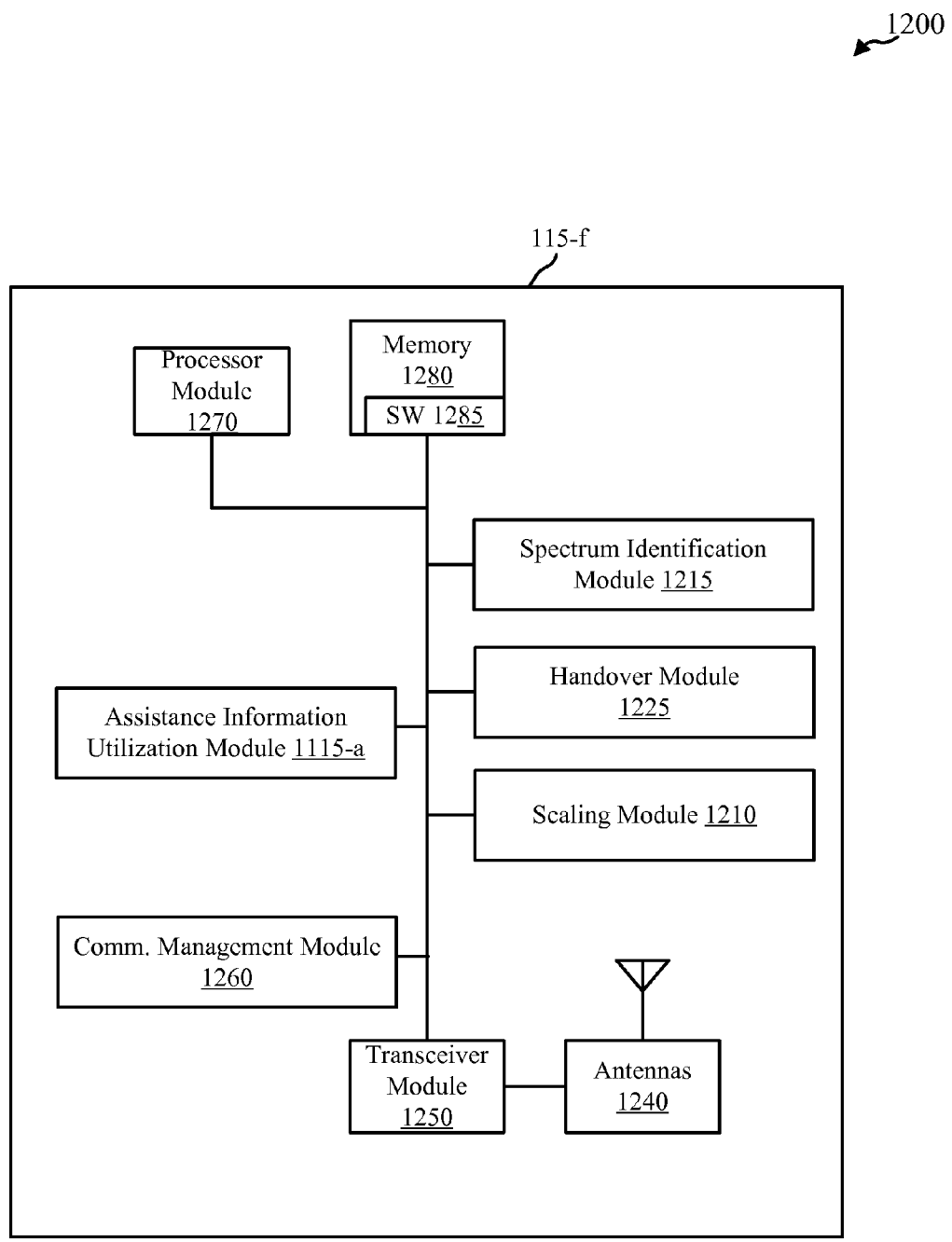
FIG. 12 shows a block diagram of a user equipment in accordance with various embodiments.

FIG. 12 is a block diagram 1200 of a user equipment **115-*f* configured to facilitate the mobility management in accordance with various embodiments. The user equipment 115-*f* may have any of various configurations, such as personal computers (e.g., laptop computers, netbook computers, tablet computers, etc.), cellular telephones, PDAs, digital video recorders (DVRs), internet appliances, gaming consoles, e-readers, etc. The user equipment 115-*f* may have an internal power supply (not shown), such as a small battery, to facilitate mobile operation. In some embodiments, the user equipment 115-*f* may be the user equipment 115 of FIG. 1, FIG. 2, FIG. 3, FIG. 10, and/or FIG. 13, and/or the device 1100 of FIG. 11. The user equipment 115-*f* may be a multi-mode user equipment. The user equipment 115-*f*** may be referred to as a wireless communications device in some cases.

The user equipment **115-*f* may include antennas 1240, a transceiver module 1250, memory 1280, and a processor module 1270, which each may be in communication, directly or indirectly, with each other (e.g., via one or more buses). The transceiver module 1250 is configured to communicate bi-directionally, via the antennas 1240 and/or one or more wired or wireless links, with one or more networks, as described above. For example, the transceiver module 1250 may be configured to communicate bi-directionally with base stations 105 of FIG. 1, FIG. 2, FIG. 3, FIG. 10, and/or FIG. 13. The transceiver module 1250 may include a modem configured to modulate the packets and provide the modulated packets to the antennas 1240 for transmission, and to demodulate packets received from the antennas 1240. While the user equipment 115-*f* may include a single antenna, the user equipment 115-*f* will typically include multiple antennas 1240** for multiple links.

The memory 1280 may include random access memory (RAM) and read-only memory (ROM). The memory 1280 may store computer-readable, computer-executable software code 1285 containing instructions that are configured to, when executed, cause the processor module 1270 to perform various functions described herein (e.g., call processing, database management, message routing, etc.). Alternatively, the software 1285 may not be directly executable by the processor module 1270 but be configured to cause the computer (e.g., when compiled and executed) to perform functions described herein.

The processor module 1270 may include an intelligent hardware device, e.g., a central processing unit (CPU) such as those made by Intel® Corporation or AMD®, a microcontroller, an application-specific integrated circuit (ASIC), etc. The processor module 1270 may include a speech encoder (not shown) configured to receive audio via a microphone, convert the audio into packets (e.g., 20 ms in length) representative of the received audio, provide the audio packets to the transceiver module 1250, and provide indications of whether a user is speaking. Alternatively, an encoder may only provide packets to the transceiver module 1250, with the provision or withholding/suppression of the packet itself providing the indication of whether a user is speaking.

According to the architecture of FIG. 12, the user equipment 115-$f$ may further include a communications management module 1260. The communications management module 1260 may manage communications with other user equipment 115. By way of example, the communications management module 1260 may be a component of the user equipment 115-$f$ in communication with some or all of the other components of the user equipment 115-$f$ via a bus. Alternatively, functionality of the communications management module 1260 may be implemented as a component of the transceiver module 1250, as a computer program product, and/or as one or more controller elements of the processor module 1270.

The components for user equipment 115-$f$ may be configured to implement aspects discussed above with respect to device 1500 of FIG. 15 and may not be repeated here for the sake of brevity. For example, the assistance information utilization module 1115-$a$ may be the assistance information utilization module 1115 of FIG. 11.

The user equipment 115-$f$ may also include a spectrum identification module 1215. The spectrum identification module 1215 may be utilized to identify spectrum available for flexible waveforms. In some embodiments, a handover module 1225 may be utilized to perform handover procedures of the user equipment 115-$f$ from one base station to another. For example, the handover module 1225 may perform a handover procedure of the user equipment 115-$f$ from one base station to another where normal and/or flexible waveforms are utilized between the user equipment 115-$f$ and one of the base stations and normal and/or flexible waveforms are utilized between the user equipment and another base station. A scaling module 1210 may be utilized to scale and/or alter chip rates to generate flexible waveforms.

In some embodiments, the transceiver module 1250 in conjunction with antennas 1240, along with other possible components of user equipment 115-$f$, may transmit information regarding flexible waveforms and/or scaling factors from the user equipment 115-$f$ to base stations or a core network. In some embodiments, the transceiver module 1250, in conjunction with antennas 1240 along with other possible components of user equipment 115-$f$, may transmit information, such as flexible waveforms and/or scaling factors, to base stations or a core network such that these devices or systems may utilize flexible waveforms.

Figure 13:
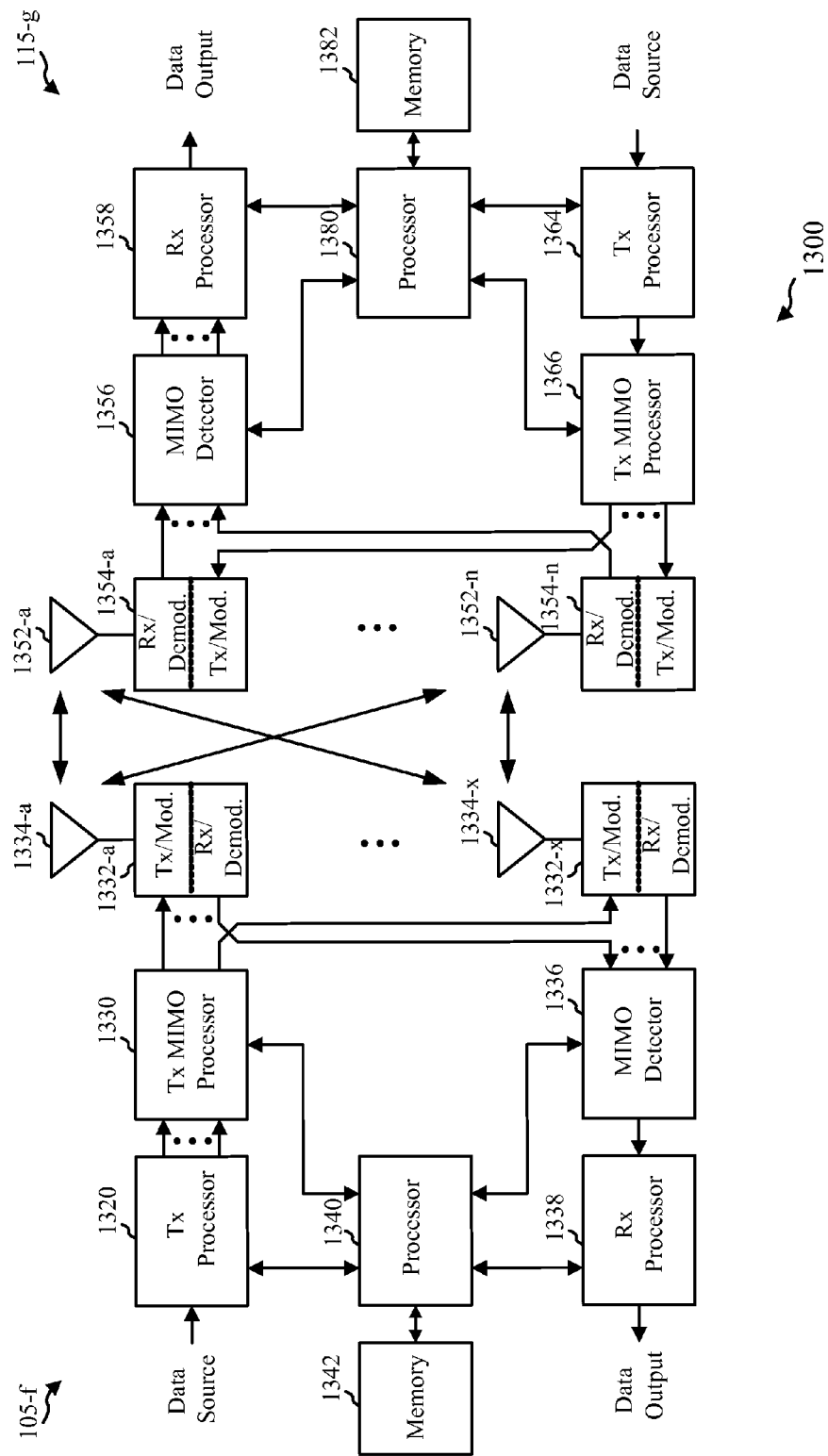
FIG. 13 shows a block diagram of a wireless communications system that includes a base station and a user equipment in accordance with various embodiments.

FIG. 13 is a block diagram of a system 1300 including a base station 105-$e$ and a user equipment 115-$g$ in accordance with various embodiments. This system 1300 may be an example of the system 100 of FIG. 1, systems 200 of FIG. 2, system 300 of FIG. 3, and/or system 1000 of FIG. 10. The base station 105-$f$ may be equipped with antennas 1334-$a$ through 1334-$x$, and the user equipment 115-$g$ may be equipped with antennas 1352-$a$ through 1352-$n$. At the base station 105-$f$, a transmit processor 1320 may receive data from a data source.

The transmitter processor 1320 may process the data. The transmitter processor 1320 may also generate reference symbols, and a cell-specific reference signal. A transmit (TX) MIMO processor 1330 may perform spatial processing (e.g., precoding) on data symbols, control symbols, and/or reference symbols, if applicable, and may provide output symbol streams to the transmit modulators 1332-$a$ through 1332-$x$. Each modulator 1332 may process a respective output symbol stream (e.g., for OFDM, etc.) to obtain an output sample stream. Each modulator 1332 may further process (e.g., convert to analog, amplify, filter, and upconvert) the output sample stream to obtain a downlink (DL) signal. In one example, DL signals from modulators 1332-$a$ through 1332-$x$ may be transmitted via the antennas 1334-$a$ through 1334-$x$, respectively. The transmitter processor 1320 may receive information from a processor 1340. The processor 1340 may be configured to generate flexible waveforms through altering a chip rate and/or utilizing a scaling factor; this may be done dynamically in some cases. The processor 1340 may also provide for different alignment and/or offsetting procedures. The processor 1340 may also utilize scaling and/or chip rate information to perform measurements on the other subsystems, perform handoffs to the other subsystems, perform reselection, etc. The processor 1340 may invert the effects of time stretching associated with the use of flexible bandwidth through parameter scaling. In some embodiments, the processor 1340 may be implemented as part of a general processor, the transmitter processor 1320, and/or the receiver processor 1338.

In some embodiments, the processor 1340 is configured for mobility management. For example, processor 1340 may be configured for signaling assistance information to one or more user equipment (UEs) 115 to facilitate mobility management with respect to a flexible bandwidth carrier or cell. In some embodiments, the processor 1340 may provide assistance information to UEs 115-$g$, for example, by: provisioning where UE may receive pre-configuration information from the operator (e.g., PLMN ID)), broadcast messages (e.g., System Information Block (SIBs)) where UE may receive information on cell-wide broadcasted SIBs while in Idle mode, and/or dedicated messages where UE may receive information through dedicated messages from the network while in connected mode. UEs can also receive SIBs in connected mode. Processor 1340 may be configured signal and/or broadcast flexible bandwidth carrier information to UEs 115 utilizing, but not limited, to the following approaches: UE-centric approaches, network-centric approaches, network-centric approaches with PLMN, new SIB creation approaches, and/or application layer approaches (e.g., generic server approaches (using SMS or data message, for example) and/or OMA—Device Management server approaches). Processor 1340 may be configured to signal information regarding flexible bandwidth scaling factors N associated with different flexible bandwidth carriers or cells to one or more UEs 115 to facilitate mobility management.

At the user equipment 115-$g$, the user equipment antennas 1352-$a$ through 1352-$n$ may receive the DL signals from the base station 105-$f$ and may provide the received signals to the demodulators 1354-$a$ through 1354-$n$, respectively. Each demodulator 1354 may condition (e.g., filter, amplify, downconvert, and digitize) a respective received signal to obtain input samples. Each demodulator 1354 may further process the input samples (e.g., for OFDM, etc.) to obtain received symbols. A MIMO detector 1356 may obtain received symbols from all the demodulators 1354-$a$ through 1354-$n$, perform MIMO detection on the received symbols if applicable, and provide detected symbols. A receive (Rx) processor 1358 may process (e.g., demodulate, deinterleave, and decode) the detected symbols, providing decoded data for the user equipment 115-*g* to a data output, and provide decoded control information to a processor 1380, or memory 1382.

On the uplink (UL), at the user equipment 115-*g*, a transmitter processor 1364 may receive and process data from a data source. The transmitter processor 1364 may also generate reference symbols for a reference signal. The symbols from the transmitter processor 1364 may be precoded by a transmit MIMO processor 1366 if applicable, further processed by the demodulators 1354-*a* through 1354-*n* (e.g., for SC-FDMA, etc.), and be transmitted to the base station 105-*f* in accordance with the transmission parameters received from the base station 105-*f*. The transmitter processor 1364 may also be configured to generate flexible waveforms through altering a chip rate and/or utilizing a scaling factor; this may be done dynamically in some cases. The transmitter processor 1364 may receive information from processor 1380. The processor 1380 may provide for different alignment and/or offsetting procedures. The processor 1380 may also utilize scaling and/or chip rate information to perform measurements on the other subsystems, perform handoffs to the other subsystems, perform reselection, etc. The processor 1380 may invert the effects of time stretching associated with the use of flexible bandwidth through parameter scaling. At the base station 105-*f*, the UL signals from the user equipment 115-*g* may be received by the antennas 1334, processed by the demodulators 1332, detected by a MIMO detector 1336 if applicable, and further processed by a receive processor. The receive processor 1338 may provide decoded data to a data output and to the processor 1380. In some embodiments, the processor 1380 may be implemented as part of a general processor, the transmitter processor 1364, and/or the receiver processor 1358.

In some embodiments, the processor 1380 is configured mobility management. For example, processor 1380 may be configured to receive assistance information to facilitate mobility management with respect to a flexible bandwidth carrier, or base stations 105 as shown throughout this application. In some embodiments, the received information provides assistance information to UE 115-*g* by: provisioning, broadcast messages, and/or dedicated messages. Some embodiments may include signaling and/or broadcasting flexible bandwidth carrier or cell information to UE 115-*g* utilizing, but not limited, to the following approaches: UE-centric approaches, network-centric approaches, network-centric approaches with PLMN, new SIB creation approaches, and/or application layer approaches.

Figure 14:
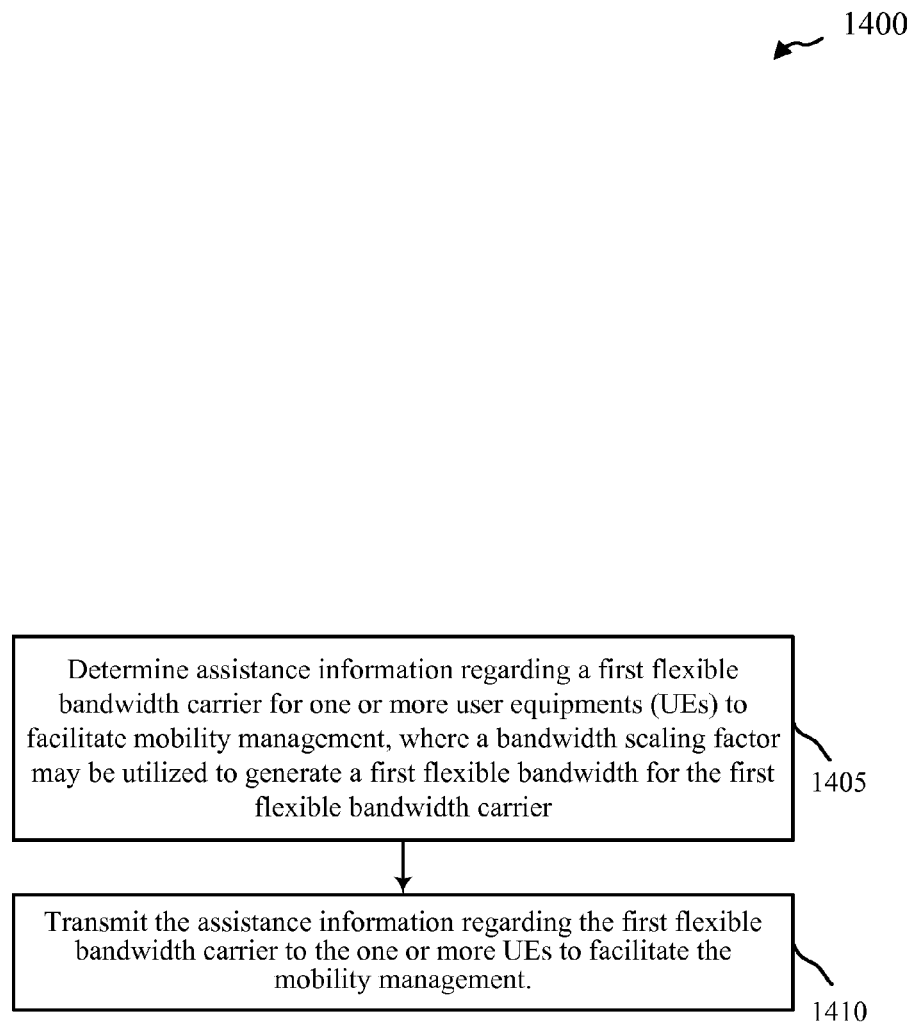
FIG. 14 shows a flow diagram of a method of mobility management in wireless communications systems in accordance with various embodiments.

Turning to FIG. 14, a flow diagram of a method 1400 for mobility management for wireless communications systems in accordance with various embodiments. Method 1400 may be implemented utilizing various wireless communications devices including, but not limited to: a base station 105 as seen in FIG. 1, FIG. 2, FIG. 3, FIG. 10, and/or FIG. 13; a device 900 as seen in FIG. 9; a core network 130 as seen in FIG. 1 and/or FIG. 10; and/or a controller 120 as seen in FIG. 1, FIG. 3, and/or FIG. 10. In some embodiments, base station 105 and controller 120 may deployed as separate entities or as a combined entity.

At block 1405, assistance information regarding a first flexible bandwidth carrier for one or more user equipment (UEs) to facilitate mobility management may be determined. A bandwidth scaling factor may be utilized to generate a first flexible bandwidth for the first flexible bandwidth carrier. At block 1410, the assistance information regarding the first flexible bandwidth carrier may be transmitted to the one or more UEs to facilitate mobility management.

Some embodiments include determining and/or transmitting the assistance information regarding the first flexible bandwidth carrier to facilitate mobility management may include determining and/or transmitting the bandwidth scaling factor associated with the first flexible bandwidth carrier to facilitate mobility management. Determining and/or transmitting the assistance information regarding the first flexible bandwidth carrier to facilitate mobility management may include determining and/or transmitting assistance information consistent with a UE-centric approach, which may include at least one or more identifiers of the first flexible bandwidth carrier, wherein the one or more identifiers include at least a carrier frequency or a PSC of the first flexible bandwidth carrier while others like the bandwidth scaling factor may be determined at the UE. Determining and/or transmitting the assistance information regarding the first flexible bandwidth carrier to facilitate mobility management may include determining and/or transmitting assistance information consistent with a network-centric approach including at least one or more bandwidth scaling factors associated with the first flexible bandwidth carrier. Determining and/or transmitting the assistance information regarding the first flexible bandwidth carrier to facilitate mobility management may include determining and/or transmitting assistance information consistent with a network-centric PLMN approach where the received information includes one or more PLMN IDs to identify the first flexible bandwidth carrier. Determining and/or transmitting the assistance information regarding the first flexible bandwidth carrier to facilitate mobility management may include determining and/or transmitting one or more SIBs, which may convey the assistance information such as including first flexible bandwidth specific information regarding the first flexible bandwidth carrier. Determining and/or transmitting the assistance information regarding the first flexible bandwidth carrier to facilitate mobility management may include determining and/or transmitting application layer based information including at least SMS, data messages, or OMA Device Management message with assistance information associated with first flexible bandwidth carrier.

In some embodiments, the assistance information to facilitate mobility management facilitates mobility between the first flexible bandwidth carrier and a second flexible bandwidth carrier. The first flexible bandwidth carrier and the second flexible bandwidth carrier may utilize the same bandwidth scaling factor. The first flexible bandwidth carrier and the second flexible bandwidth carrier may utilize different bandwidth scaling factors. The assistance information to facilitate mobility management may facilitate mobility between the flexible bandwidth carrier and a normal bandwidth carrier.

Some embodiments include determining assistance information regarding a at least a second flexible bandwidth carrier for one or more user equipment to facilitate mobility management. The second bandwidth scaling factors may be utilized to generate a flexible bandwidth for the second flexible bandwidth carrier. Some embodiments include transmitting the assistance information regarding at least the second flexible bandwidth carrier to the one or more UEs to facilitate mobility management. For example, in some cases, assistance information regarding additional flexible bandwidth carriers may be transmitting to the one or more UEs.

Some embodiments include transmitting the assistance information regarding the first flexible bandwidth carrier to the one or more UEs to facilitate mobility management where transmitting the assistance information occurs over a first bandwidth carrier different from the first flexible bandwidth carrier. Transmitting the assistance information over the first bandwidth carrier different from the first flexible bandwidth carrier may include transmitting the assistance information over a normal bandwidth carrier. Transmitting the assistance information over the first bandwidth carrier different from the first flexible bandwidth carrier may include transmitting the assistance information over a second flexible bandwidth carrier.

In some embodiments, the first flexible bandwidth carrier is associated with a first flexible bandwidth cell.

Figure 15:
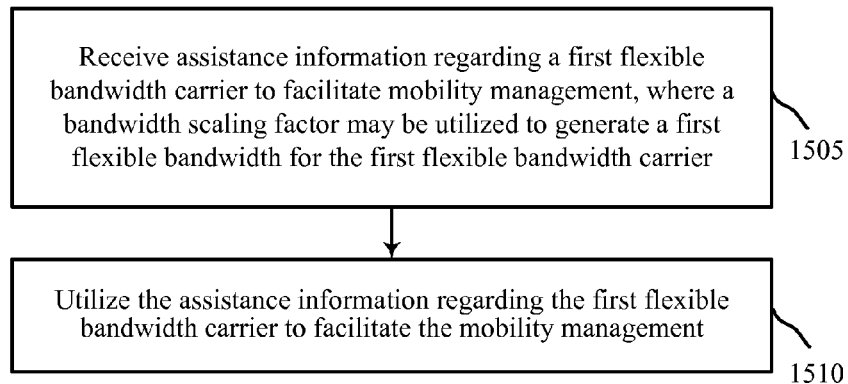
FIG. 15 shows a flow diagram of a method of mobility management in wireless communications systems in accordance with various embodiments.

Turning to FIG. 15, a flow diagram of a method 1500 for mobility management for wireless communications systems in accordance with various embodiments. Method 1500 may be implemented utilizing various wireless communications devices including, but not limited to: a user equipment 115 as seen in FIG. 1, FIG. 2, FIG. 3, FIG. 10, FIG. 12, and/or FIG. 13; and/or a device 1100 as seen in FIG. 11.

At block 1505, assistance information regarding a first flexible bandwidth carrier to facilitate mobility management may be received. A bandwidth scaling factor may be utilized to generate a first flexible bandwidth for the first flexible bandwidth carrier. At block 1510, the assistance information regarding the first flexible bandwidth carrier may be utilized to facilitate mobility management.

Receiving the assistance information regarding the first flexible bandwidth carrier to facilitate mobility management may include receiving the bandwidth scaling factor associated with the first flexible bandwidth carrier to facilitate mobility management. Receiving the assistance information regarding the first flexible bandwidth carrier to facilitate mobility management may include receiving assistance information consistent with a UE-centric approach, which may include at least one or more identifiers of the first flexible bandwidth carrier, wherein the one or more identifiers include at least a carrier frequency or a PSC of the first flexible bandwidth carrier while others like the bandwidth scaling factor is determined at the UE Receiving the assistance information regarding the first flexible bandwidth carrier to facilitate mobility management may include receiving assistance information consistent with a network-centric approach including at least one or more bandwidth scaling factors associated with the first flexible bandwidth carrier. Receiving the assistance information regarding the first flexible bandwidth carrier to facilitate mobility management may include receiving assistance information consistent with anetwork-centric PLMN approach where the received information includes one or more PLMN IDs to identify the first flexible bandwidth carrier. Receiving the assistance information regarding the first flexible bandwidth carrier to facilitate mobility management may include receiving one or more SIBs, which may convey the assistance information such as including first flexible bandwidth specific information regarding the first flexible bandwidth carrier. Receiving the assistance information regarding the first flexible bandwidth carrier to facilitate mobility management may include receiving application layer based information including at least SMS, data messages, or OMA Device Management message with assistance information associated with first flexible bandwidth carrier.

In some embodiments, the assistance information to facilitate mobility management facilitates mobility between the first flexible bandwidth carrier and a second flexible bandwidth carrier, or other flexible bandwidth carriers. The first flexible bandwidth carrier and the second flexible bandwidth carrier may utilize the same bandwidth scaling factor. The first flexible bandwidth carrier and the second flexible bandwidth carrier may utilize different bandwidth scaling factors. The assistance information to facilitate mobility management may facilitate mobility between the flexible bandwidth carrier and a normal bandwidth carrier.

Some embodiments include receiving assistance information regarding a second flexible bandwidth carrier to facilitate mobility management. The second bandwidth scaling factors may be utilized to generate a flexible bandwidth for the second flexible bandwidth carrier. Some embodiments include utilizing the assistance information regarding the second flexible bandwidth carrier to facilitate mobility management.

In some embodiments, receiving the assistance information regarding the first flexible bandwidth carrier to facilitate mobility management includes receiving the assistance information over a first bandwidth carrier different from the first flexible bandwidth carrier. Receiving the assistance information over the first bandwidth carrier different from the first flexible bandwidth carrier may include receiving the assistance information over a normal bandwidth carrier. Receiving the assistance information over the first bandwidth carrier different from the first flexible bandwidth carrier may include receiving the assistance information over a second flexible bandwidth carrier.

In some embodiments, the first flexible bandwidth carrier is associated with a first flexible bandwidth cell.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general-purpose or special-purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of mobility management for wireless communications systems, the method comprising:
   determining assistance information regarding a first flexible bandwidth carrier for one or more user equipment (UEs) to facilitate mobility management, wherein a bandwidth scaling factor is utilized to generate a first flexible bandwidth for the first flexible bandwidth carrier, and wherein the first flexible bandwidth carrier is generated with respect to a normal bandwidth carrier through scaling, using the bandwidth scaling factor, a chip rate of the first flexible bandwidth carrier with respect to the normal bandwidth carrier; and
   transmitting the assistance information regarding the first flexible bandwidth carrier to the one or more UEs to facilitate the mobility management, wherein the mobility management facilitates mobility between the first flexible bandwidth carrier and at least a second bandwidth carrier.

2. The method of claim 1, wherein transmitting the assistance information regarding the first flexible bandwidth carrier for the one or more UEs to facilitate the mobility management comprises:
   transmitting the bandwidth scaling factor associated with the first flexible bandwidth carrier for the one or more UEs to facilitate the mobility management.

3. The method of claim 1, wherein transmitting the assistance information regarding the first flexible bandwidth carrier for the one or more UEs to facilitate the mobility management comprises:
   transmitting assistance information consistent with a UE-centric approach including at least one or more identifiers of the first flexible bandwidth carrier, wherein the one or more identifiers include at least a carrier frequency or a Primary Scrambling Code of the first flexible bandwidth carrier.

4. The method of claim 1, wherein transmitting the assistance information regarding the first flexible bandwidth carrier for the one or more UEs to facilitate the mobility management comprises:
   transmitting assistance information consistent with a network-centric approach including at least one or more bandwidth scaling factors associated with the first flexible bandwidth carrier.

5. The method of claim 1, wherein transmitting the assistance information regarding the first flexible bandwidth carrier for the one or more UEs to facilitate the mobility management comprises:
   determining assistance information consistent with a network-centric approach including one or more PLMN IDs to identify the first flexible bandwidth carrier.

6. The method of claim 1, wherein transmitting the assistance information regarding the first flexible bandwidth carrier for the one or more UEs to facilitate the mobility management comprises:
   transmitting one or more SIBs to convey the assistance information regarding the first flexible bandwidth carrier.

7. The method of claim 1, wherein transmitting the assistance information regarding the first flexible bandwidth carrier for the one or more UEs to facilitate the mobility management comprises:
   transmitting application layer-based information including at least SMS, data messages, or OMA Device Management message with assistance information associated with the first flexible bandwidth carrier.

8. The method of claim 1, wherein the at least the second bandwidth carrier is a second flexible bandwidth carrier, and wherein the first flexible bandwidth carrier and the second flexible bandwidth carrier utilize the same bandwidth scaling factor.

9. The method of claim 1, wherein the at least the second bandwidth carrier is a second flexible bandwidth carrier, and wherein the first flexible bandwidth carrier and the second flexible bandwidth carrier utilize different bandwidth scaling factors.

10. The method of claim 1, wherein the at least the second bandwidth carrier is a normal bandwidth carrier.

11. The method of claim 1, further comprising:
determining assistance information regarding at least a second flexible bandwidth carrier for the one or more UEs to facilitate the mobility management, wherein a second bandwidth scaling factor is utilized to generate a flexible bandwidth for the second flexible bandwidth carrier; and
transmitting the assistance information regarding at least the second flexible bandwidth carrier to the one or more UEs to facilitate the mobility management.

12. The method of claim 1, wherein transmitting the assistance information regarding the first flexible bandwidth carrier to the one or more UEs to facilitate the mobility management comprises:
transmitting the assistance information over a first bandwidth carrier different from the first flexible bandwidth carrier.

13. The method of claim 12, wherein transmitting the assistance information over the first bandwidth carrier different from the first flexible bandwidth carrier comprises:
transmitting the assistance information over a normal bandwidth carrier.

14. The method of claim 12, wherein transmitting the assistance information over the first bandwidth carrier different from the first flexible bandwidth carrier comprises:
transmitting the assistance information over a second flexible bandwidth carrier.

15. The method of claim 1, wherein the first flexible bandwidth carrier is associated with a first flexible bandwidth cell.

16. A method of mobility management for wireless communications systems, the method comprising:
receiving assistance information regarding a first flexible bandwidth carrier to facilitate the mobility management, wherein a bandwidth scaling factor is utilized to generate a first flexible bandwidth for the first flexible bandwidth carrier, and wherein the first flexible bandwidth carrier is generated with respect to a normal bandwidth carrier through scaling, using the bandwidth scaling factor, a chip rate of the first flexible bandwidth carrier with respect to the normal bandwidth carrier; and
utilizing the assistance information regarding the first flexible bandwidth carrier to facilitate the mobility management, wherein the mobility management facilitates mobility between the first flexible bandwidth carrier and at least a second bandwidth carrier.

17. The method of claim 16, wherein receiving the assistance information regarding the first flexible bandwidth carrier to facilitate the mobility management comprises:
receiving the bandwidth scaling factor associated with the first flexible bandwidth carrier to facilitate the mobility management.

18. The method of claim 16, wherein receiving the assistance information regarding the first flexible bandwidth carrier to facilitate the mobility management comprises:
receiving assistance information consistent with a UE-centric approach including at least one or more identifiers of the first flexible bandwidth carrier, wherein the one or more identifiers include at least a carrier frequency or a Primary Scrambling Code of the first flexible bandwidth carrier.

19. The method of claim 16, wherein receiving the assistance information regarding the first flexible bandwidth carrier to facilitate the mobility management comprises:
receiving assistance information consistent with a network-centric approach including at least one or more bandwidth scaling factors associated with the first flexible bandwidth carrier.

20. The method of claim 16, wherein receiving the assistance information regarding the first flexible bandwidth carrier to facilitate the mobility management comprises:
receiving assistance information consistent with a network centric approach including one or more PLMN IDs to identify the first flexible bandwidth carrier.

21. The method of claim 16, wherein receiving the assistance information regarding the first flexible bandwidth carrier to facilitate the mobility management comprises:
receiving one or more SIBs that convey the assistance information regarding the first flexible bandwidth carrier.

22. The method of claim 16, wherein receiving the assistance information regarding the first flexible bandwidth carrier to facilitate the mobility management comprises:
receiving application layer based information including at least SMS, data messages, or OMA Device Management message with assistance information associated with the first flexible bandwidth carrier.

23. The method of claim 16, wherein the at least the second bandwidth carrier is a second flexible bandwidth carrier, and wherein the first flexible bandwidth carrier and the second flexible bandwidth carrier utilize the same bandwidth scaling factor.

24. The method of claim 16, wherein the at least the second bandwidth carrier is a second flexible bandwidth carrier, and wherein the first flexible bandwidth carrier and the second flexible bandwidth carrier utilize different bandwidth scaling factors.

25. The method of claim 16, wherein the at least the second bandwidth carrier is a normal bandwidth carrier.

26. The method of claim 16, further comprising:
receiving assistance information regarding at least a second flexible bandwidth carrier to facilitate the mobility management, wherein a second bandwidth scaling factor is utilized to generate a flexible bandwidth for the second flexible bandwidth carrier; and
utilizing the assistance information regarding at least the second flexible bandwidth carrier to facilitate the mobility management.

27. The method of claim 16, wherein receiving the assistance information regarding the first flexible bandwidth carrier to facilitate the mobility management comprises:
receiving the assistance information over a first bandwidth carrier different from the first flexible bandwidth carrier.

28. The method of claim 27, wherein receiving the assistance information over the first bandwidth carrier different from the first flexible bandwidth carrier comprises:
receiving the assistance information over a normal bandwidth carrier.

29. The method of claim 27, wherein receiving the assistance information over the first bandwidth carrier different from the first flexible bandwidth carrier comprises:
receiving the assistance information over a second flexible bandwidth carrier.

30. The method of claim 16, wherein the first flexible bandwidth carrier is associated with a first flexible bandwidth cell.

31. The method of claim 16, wherein receiving the assistance information and utilizing the assistance information occurs at a user equipment (UE).

32. A wireless communications system configured for mobility management for wireless communications, the wireless communications system comprising:
  means for determining assistance information regarding a first flexible bandwidth carrier for one or more user equipment (UEs) to facilitate the mobility management, wherein a bandwidth scaling factor is utilized to generate a first flexible bandwidth for the first flexible bandwidth carrier, and wherein the first flexible bandwidth carrier is generated with respect to a normal bandwidth carrier through scaling, using the bandwidth scaling factor, a chip rate of the first flexible bandwidth carrier with respect to the normal bandwidth carrier; and
  means for transmitting the assistance information regarding the first flexible bandwidth carrier to the one or more UEs to facilitate the mobility management, wherein the mobility management facilitates mobility between the first flexible bandwidth carrier and at least a second bandwidth carrier.

33. The wireless communications system of claim 32, further comprising:
  means for determining assistance information regarding at least a second flexible bandwidth carrier for the one or more UEs to facilitate the mobility management, wherein a second bandwidth scaling factor is utilized to generate a flexible bandwidth for the second flexible bandwidth carrier; and
  means for transmitting the assistance information regarding at least the second flexible bandwidth carrier to the one or more UEs to facilitate the mobility management.

34. The wireless communications system of claim 32, wherein the means for transmitting the assistance information regarding the first flexible bandwidth carrier to the one or more UEs to facilitate the mobility management comprises:
  means for transmitting the assistance information over a first bandwidth carrier different from the first flexible bandwidth carrier.

35. The wireless communications system of claim 34, wherein the means for transmitting the assistance information over the first bandwidth carrier different from the first flexible bandwidth carrier comprises:
  means for transmitting the assistance information over a normal bandwidth carrier.

36. The wireless communications system of claim 34, wherein the means for transmitting the assistance information over the first bandwidth carrier different from the first flexible bandwidth carrier comprises:
  means for transmitting the assistance information over a second flexible bandwidth carrier.

37. A computer program product for mobility management for wireless communications systems comprising:
  a non-transitory computer-readable medium comprising:
    code for determining assistance information regarding a first flexible bandwidth carrier for one or more user equipment (UEs) to facilitate the mobility management, wherein a bandwidth scaling factor is utilized to generate a first flexible bandwidth for the first flexible bandwidth carrier, and wherein the first flexible bandwidth carrier is generated with respect to a normal bandwidth carrier through scaling, using the bandwidth scaling factor, a chip rate of the first flexible bandwidth carrier with respect to the normal bandwidth carrier; and
    code for transmitting the assistance information regarding the first flexible bandwidth carrier to the one or more UEs to facilitate the mobility management, wherein the mobility management facilitates mobility between the first flexible bandwidth carrier and at least a second bandwidth carrier.

38. The computer program product of claim 37, wherein the non-transitory computer-readable medium further comprising:
  code for determining assistance information regarding at least a second flexible bandwidth carrier for the one or more UEs to facilitate the mobility management, wherein a second bandwidth scaling factor is utilized to generate a flexible bandwidth for the second flexible bandwidth carrier; and
  code for transmitting the assistance information regarding at least the second flexible bandwidth carrier to the one or more UEs to facilitate the mobility management.

39. The computer program product of claim 37, wherein the code for transmitting the assistance information regarding the first flexible bandwidth carrier to the one or more UEs to facilitate the mobility management comprises:
  code for transmitting the assistance information over a first bandwidth carrier different from the first flexible bandwidth carrier.

40. The computer program product of claim 39, wherein the code transmitting the assistance information over the first bandwidth carrier different from the first flexible bandwidth carrier comprises:
  code for transmitting the assistance information over a normal bandwidth carrier.

41. The computer program product of claim 39, wherein the code for transmitting the assistance information over the first bandwidth carrier different from the first flexible bandwidth carrier comprises:
  code for transmitting the assistance information over a second flexible bandwidth carrier.

42. A wireless communications device configured for mobility management for wireless communications systems, the device comprising:
  at least one processor configured to:
    determine assistance information regarding a first flexible bandwidth carrier for one or more user equipment (UEs) to facilitate the mobility management, wherein a bandwidth scaling factor is utilized to generate a first flexible bandwidth for the first flexible bandwidth carrier, and wherein the first flexible bandwidth carrier is generated with respect to a normal bandwidth carrier through scaling, using the bandwidth scaling factor, a chip rate of the first flexible bandwidth carrier with respect to the normal bandwidth carrier; and
    transmit the assistance information regarding the first flexible bandwidth carrier to the one or more UEs to facilitate the mobility management, wherein the mobility management facilitates mobility between the first flexible bandwidth carrier and at least a second bandwidth carrier; and
  at least one memory coupled with the at least one processor.

43. The wireless communications device of claim 42, wherein the at least one processor is further configured to:
  determine assistance information regarding at least a second flexible bandwidth carrier for the one or more UEs to facilitate the mobility management, wherein a second bandwidth scaling factor is utilized to generate a flexible bandwidth for the second flexible bandwidth carrier; and transmit the assistance information regarding at least the second flexible bandwidth carrier to the one or more UEs to facilitate the mobility management.

44. The wireless communications device of claim 42, wherein the at least one processor configured to transmit the assistance information regarding the first flexible bandwidth carrier to the one or more UEs to facilitate the mobility management is configured to:

transmit the assistance information over a first bandwidth carrier different from the first flexible bandwidth carrier.

45. The wireless communications device of claim 44, wherein the at least one processor configured to transmit the assistance information over the first bandwidth carrier different from the first flexible bandwidth carrier is configured to:

transmit the assistance information over a normal bandwidth carrier.

46. The wireless communications device of claim 44, wherein the at least one processor configured to transmit the assistance information over the first bandwidth carrier different from the first flexible bandwidth carrier is configured to:

transmit the assistance information over a second flexible bandwidth carrier.

47. A wireless communications system configured for mobility management for wireless communications, the wireless communications system comprising:

means for receiving assistance information regarding a first flexible bandwidth carrier to facilitate the mobility management, wherein a bandwidth scaling factor is utilized to generate a first flexible bandwidth for the first flexible bandwidth carrier, and wherein the first flexible bandwidth carrier is generated with respect to a normal bandwidth carrier through scaling, using the bandwidth scaling factor, a chip rate of the first flexible bandwidth carrier with respect to the normal bandwidth carrier; and means for utilizing the assistance information regarding the first flexible bandwidth carrier to facilitate the mobility management, wherein the mobility management facilitates mobility between the first flexible bandwidth carrier and at least a second bandwidth carrier.

48. The wireless communications system of claim 47, wherein the means for receiving the assistance information regarding the first flexible bandwidth carrier to facilitate the mobility management comprises:

means for receiving the assistance information over a first bandwidth carrier different from the first flexible bandwidth carrier.

49. The wireless communications system of claim 48, wherein the means for receiving the assistance information over the first bandwidth carrier different from the first flexible bandwidth carrier comprises:

means for receiving the assistance information over a normal bandwidth carrier.

50. The wireless communications system of claim 48, wherein the means for receiving the assistance information over the first bandwidth carrier different from the first flexible bandwidth carrier comprises:

means for receiving the assistance information over a second flexible bandwidth carrier.

51. A computer program product for mobility management for wireless communications systems comprising:

a non-transitory computer-readable medium comprising:

code for receiving assistance information regarding a first flexible bandwidth carrier to facilitate the mobility management, wherein a bandwidth scaling factor is utilized to generate a first flexible bandwidth for the first flexible bandwidth carrier, and wherein the first flexible bandwidth carrier is generated with respect to a normal bandwidth carrier through scaling, using the bandwidth scaling factor, a chip rate of the first flexible bandwidth carrier with respect to the normal bandwidth carrier; and code for utilizing the assistance information regarding the first flexible bandwidth carrier to facilitate the mobility management, wherein the mobility management facilitates mobility between the first flexible bandwidth carrier and at least a second bandwidth carrier.

52. The computer program product of claim 51, wherein the code for receiving the assistance information regarding the first flexible bandwidth carrier to facilitate the mobility management comprises:

code for receiving the assistance information over a first bandwidth carrier different from the first flexible bandwidth carrier.

53. The computer program product of claim 52, wherein the code for receiving the assistance information over the first bandwidth carrier different from the first flexible bandwidth carrier comprises:

code for receiving the assistance information over a normal bandwidth carrier.

54. The computer program product of claim 52, wherein the code for receiving the assistance information over the first bandwidth carrier different from the first flexible bandwidth carrier comprises:

code for receiving the assistance information over a second flexible bandwidth carrier.

55. A wireless communications device configured for mobility management for wireless communications systems, the device comprising:

at least one processor configured to:

receive assistance information regarding a first flexible bandwidth carrier to facilitate the mobility management, wherein a bandwidth scaling factor is utilized to generate a first flexible bandwidth for the first flexible bandwidth carrier, and wherein the first flexible bandwidth carrier is generated with respect to a normal bandwidth carrier through scaling, using the bandwidth scaling factor, a chip rate of the first flexible bandwidth carrier with respect to the normal bandwidth carrier; and utilize the assistance information regarding the first flexible bandwidth carrier to facilitate the mobility management, wherein the mobility management facilitates mobility between the first flexible bandwidth carrier and at least a second bandwidth carrier; and at least one memory coupled with the at least one processor.

56. The wireless communications device of claim 55, wherein the at least one processor configured to receive the assistance information regarding the first flexible bandwidth carrier to facilitate the mobility management is configured to:

receive the assistance information over a first bandwidth carrier different from the first flexible bandwidth carrier.

57. The wireless communications device of claim 56, wherein the at least one processor configured to receive the assistance information over the first bandwidth carrier different from the first flexible bandwidth carrier is configured to:

receive the assistance information over a normal bandwidth carrier.

58. The wireless communications device of claim 56, wherein the at least one processor configured to receive the assistance information over the first bandwidth carrier different from the first flexible bandwidth carrier is configured to:

receive the assistance information over a second flexible bandwidth carrier.

* * * * *